US012769439B2

(12) United States Patent
Li et al.

(10) Patent No.: US 12,769,439 B2
(45) Date of Patent: Oct. 20, 2026

(54) METHOD FOR PROCESSING USER INTERFACE OF APPLICATION AND RELATED DEVICE

(71) Applicant: HUAWEI TECHNOLOGIES CO., LTD., Shenzhen (CN)

(72) Inventors: Dawei Li, Nanjing (CN); Shimiao Yang, Hangzhou (CN); Zhechu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 18/839,516

(22) PCT Filed: Feb. 20, 2023

(86) PCT No.: PCT/CN2023/077103
§ 371 (c)(1),
(2) Date: Aug. 19, 2024

(87) PCT Pub. No.: WO2023/160489
PCT Pub. Date: Aug. 31, 2023

(65) Prior Publication Data

US 2025/0157105 A1 May 15, 2025

(30) Foreign Application Priority Data

Feb. 22, 2022 (CN) ......................... 202210164601.0

(51) Int. Cl.
*G06F 3/0484* (2022.01)
*G06F 3/14* (2006.01)
*G06T 11/60* (2006.01)

(52) U.S. Cl.
CPC .............. *G06F 3/0484* (2013.01); *G06F 3/14* (2013.01); *G06T 11/60* (2013.01); *G06T 2200/24* (2013.01)

(58) Field of Classification Search
CPC ..................................................... G06F 3/0484
(Continued)

(56) References Cited

U.S. PATENT DOCUMENTS 9,939,963 B2 * 4/2018 Beckman .................. G06F 3/14
10,785,310 B1 * 9/2020 Mohen ................ G06F 3/04842
(Continued)

FOREIGN PATENT DOCUMENTS

CN 101996068 A 3/2011
CN 104063211 A 9/2014
(Continued)

OTHER PUBLICATIONS

Extended European Search Report in European Appln. No. 23759114.4, mailed on Feb. 26, 2025, 10 pages.
(Continued)

*Primary Examiner* — Reza Nabi
(74) *Attorney, Agent, or Firm* — Fish & Richardson P.C.

(57) ABSTRACT

Example methods for processing a user interface of an application and a related device are disclosed. One example method includes: if a difference between a size of a current display region and a size of a target display region satisfies a target condition, obtaining first layout information corresponding to the user interface when the user interface is displayed in the current display region, where the first layout information is obtained based on target layout information used when the user interface is displayed in the target display region, and when the user interface changes from a layout manner indicated by the target layout information to a layout manner indicated by the first layout information, a size change ratio of a first composition element is different from a size change ratio of a second composition element.

15 Claims, 14 Drawing Sheets

(58) Field of Classification Search
USPC .......................................................... 715/778
See application file for complete search history.

(56) References Cited

U.S. PATENT DOCUMENTS

| | | | | |
|---|---|---|---|---|
| 11,003,340 | B2 * | 5/2021 | Kawashima | G06F 3/0412 |
| 11,064,256 | B1 * | 7/2021 | Voss | H04N 7/147 |
| 11,294,529 | B2 * | 4/2022 | Vranjes | G06F 3/04815 |
| 11,709,560 | B2 * | 7/2023 | Missig | G06F 3/0488 715/823 |
| 2007/0101297 | A1 * | 5/2007 | Forstall | G06F 3/0482 715/835 |
| 2008/0270890 | A1 * | 10/2008 | Stern | G06F 16/9577 707/999.102 |
| 2009/0265660 | A1 * | 10/2009 | Nobori | G06F 3/1462 715/788 |
| 2011/0145759 | A1 * | 6/2011 | Leffert | G06F 3/04847 715/800 |
| 2011/0185317 | A1 * | 7/2011 | Thimbleby | G06F 3/04845 715/863 |
| 2012/0017162 | A1 * | 1/2012 | Khokhlov | G06F 9/451 715/765 |
| 2012/0060087 | A1 * | 3/2012 | Jame | G06F 16/9577 715/238 |
| 2013/0104075 | A1 * | 4/2013 | Matthews | G06F 9/451 715/800 |
| 2014/0053111 | A1 * | 2/2014 | Beckman | G06F 3/0481 345/672 |
| 2016/0070423 | A1 * | 3/2016 | Doan | G06F 9/451 715/783 |
| 2017/0351645 | A1 * | 12/2017 | Nadiv | G06F 40/166 |
| 2018/0330474 | A1 * | 11/2018 | Mehta | G06T 3/4061 |
| 2019/0087069 | A1 * | 3/2019 | McCauley | G06F 8/38 |
| 2022/0035521 | A1 * | 2/2022 | Smochko | G06F 3/03547 |
| 2024/0028180 | A1 * | 1/2024 | Li | G06F 1/1652 |
| 2024/0241628 | A1 * | 7/2024 | Kimoto | A61B 6/463 |
| 2024/0404000 | A1 * | 12/2024 | Bourgin | G06T 11/60 |
| 2024/0411421 | A1 * | 12/2024 | Pastrana Vicente | G06F 3/011 |

FOREIGN PATENT DOCUMENTS

| | | | | | |
|---|---|---|---|---|---|
| CN | 106649369 | A | | 5/2017 | |
| CN | 109783181 | A | | 5/2019 | |
| CN | 110221899 | A | | 9/2019 | |
| CN | 110427150 | A | | 11/2019 | |
| CN | 112114912 | A | | 12/2020 | |
| CN | 112116681 | A | | 12/2020 | |
| CN | 114077429 | A | | 2/2022 | |
| CN | 114327701 | A | | 4/2022 | |
| WO | WO-2015196822 | A1 | * | 12/2015 | G06F 16/00 |

OTHER PUBLICATIONS

International Search Report and Written Opinion in International Appln. No. PCT/CN2023/077103, mailed on Apr. 2, 2023, 16 pages (with English translation).

* cited by examiner

METHOD FOR PROCESSING USER INTERFACE OF APPLICATION AND RELATED DEVICE

This application is a National Stage of International Application No. PCT/CN2023/077103, filed on Feb. 20, 2023, which claims priority to Chinese Patent Application No. 202210164601.0, filed on Feb. 22, 2022, both of which are hereby incorporated by reference in their entireties.

TECHNICAL FIELD

This application relates to the field of computer technologies, and in particular, to a method for processing a user interface of an application and a related device.

BACKGROUND

With the development of computer technologies, various electronic devices tend to be intelligent, and more types of electronic devices can run applications. When these electronic devices need to receive a control instruction of a user or output information to a user, screens of the electronic devices usually need to be used as media. These electronic devices are not uniform in size.

To ensure good user experience, for a same application, a person skilled in the art develops a version for a screen of each specification, that is, for a same application, the person skilled in the art needs to develop a plurality of applications with different layout information to adapt to screens of different specifications.

As more forms of electronic devices are available, a solution for reducing development burden of the person skilled in the art urgently needs to be provided.

SUMMARY

Embodiments of this application provide a method for processing a user interface of an application and a related device. A developer only needs to design layout information of the user interface in a display region (namely, a target display region) of one size, which reduces development burden of a person skilled in the art; and when the user interface changes from a layout manner indicated by target layout information to a layout manner indicated by first layout information, not all composition elements on the user interface are uniformly zoomed in/out, which helps improve adaptation between the target layout information and the target display region.

To resolve the foregoing technical problem, embodiments of this application provide the following technical solutions.

According to a first aspect, an embodiment of this application provides a method for processing a target user interface of an application, and the method may be used in the field of computer technologies. The method may include: An electronic device obtains a size of a current display region corresponding to the target user interface, where the target user interface is a man-machine interaction interface, of the application, displayed on a screen of the terminal device. A target user interface may be a web target user interface or a native target user interface. Information of the web target user interface is sent to the terminal device by a server corresponding to the application, and information of the native target user interface is directly generated by the terminal device. The current display region corresponding to the target user interface may alternatively be referred to as a current view of the target user interface. Because a partial region of an entire screen of the terminal device may be used to display the target user interface, or the entire screen of the terminal device may be used to display the target user interface, the "current display region corresponding to the target user interface" is a region that is on the screen of the terminal device and that is used to display the target user interface.

When a difference between the size of the current display region and a size of a target display region satisfies a target condition, the electronic device obtains first layout information corresponding to the target user interface when the target user interface is displayed in the current display region, where the first layout information indicates a layout manner of a composition element of the target user interface in the current display region, the first layout information is obtained based on target layout information used when the target user interface is displayed in the target display region, the target user interface has a first composition element and a second composition element, and when the target user interface changes from a layout manner indicated by the target layout information to the layout manner indicated by the first layout information, a size change ratio of the first composition element is different from a size change ratio of the second composition element.

In this implementation, when a user interface needs to be displayed in a display region of any other size, layout information of the user interface in the target display region may be changed. To be specific, a developer only needs to design the layout information of the user interface in a display region (namely, the target display region) of one size, which greatly reduces development burden of the person skilled in the art; and when the user interface changes from the layout manner indicated by the target layout information to the layout manner indicated by the first layout information, the size change ratio of the first composition element and the size change ratio of the second composition element on the user interface may be different, that is, not all composition elements on the user interface are uniformly zoomed in/out, which helps improve adaptation between the target layout information and the target display region.

In a possible implementation of the first aspect, both the first layout information and the target layout information are layout information corresponding to the target user interface. If the method for processing the target user interface of the application provided in this embodiment of this application is used before the electronic device performs a rendering operation on the target user interface, both the "first layout information and the target layout information" include information required for performing the rendering operation on the target user interface. For example, if the target user interface is the web user interface, the "layout information corresponding to the target user interface" may include a hypertext markup language (HTML) file and a cascading style sheets (CSS) style. For another example, for example, the target user interface is the native user interface, and the "layout information corresponding to the target user interface" may be an extensible markup language (XML) file, a CSS style, and the like. This is not listed exhaustively herein.

If the method for processing the target user interface of the application provided in this embodiment of this application is used in a process in which the electronic device performs a rendering operation on the target user interface, the "target layout information" may include location information of each composition element on the target user interface in the target display region, and the "first layout information" may include location information of each composition element on the target user interface in the current display region.

Further, the process of performing the rendering (Render) operation is a process of generating a visual user interface based on data that describes the user interface, and the data that describes the user interface describes elements on the user interface by using a strictly defined data structure or language, and includes a geometric shape, a texture, a location, or other information of the elements on the user interface.

In a possible implementation of the first aspect, a length of a width side of the target display region is less than a length of a width side of the current display region, the target display region and the current display region each include a width side and a height side, the width side of the target display region and a height side of the target display region are two sides that are not parallel to each other, and the length of the width side of the target display region is less than a length of the height side of the target display region. Usually, when the target user interface is displayed in the target display region, a sliding function does not exist on the width side of the target display region, and the sliding function exists on the height side of the target display region. Correspondingly, the width side of the current display region and a height side of the current display region are two sides that are not parallel to each other. When the target user interface is displayed in the current display region, the sliding function does not exist on the width side of the current display region, and the sliding function exists on the height side of the current display region.

In this implementation, a person skilled in the art finds in design that difficulty in changing the user interface from being displayed on a narrow screen to being displayed on a wide screen is low, and difficulty in changing the user interface from being displayed on a wide screen to being displayed on a narrow screen is high. Therefore, the length of the width side of the target display region is less than the length of the width side of the current display region, and the sliding function does not exist on the width of the target display region, that is, changing from the target display region to the current display region is a process of changing from the narrow screen to the wide screen. This helps reduce difficulty of processing the user interface.

In a possible implementation of the first aspect, if the method is used before a rendering operation is performed on the target user interface, the method further includes: The electronic device obtains second layout information corresponding to the target user interface when the target user interface is displayed in the current display region, where when the target user interface changes from the layout manner indicated by the target layout information to a layout manner indicated by the second layout information, size change ratios of different composition elements on the target user interface are the same. That the electronic device obtains first layout information corresponding to the target user interface when the target user interface is displayed in the current display region includes: The electronic device generates the first layout information based on the second layout information.

In this implementation, the second layout information corresponding to the target user interface when the target user interface is displayed in the current display region is first obtained. When the user interface changes from the layout manner indicated by the target layout information to the layout manner indicated by the second layout information, the size change ratios of the different composition elements on the user interface are the same. Then the first layout information is generated based on the second layout information, which helps reduce difficulty in a process of obtaining the first layout information, and in addition, when the first layout information is obtained in the foregoing manner, a processing procedure of a browser kernel does not need to be updated, which helps further reduce the difficulty in the process of obtaining the first layout information.

In a possible implementation of the first aspect, a size change rule may be configured on the electronic device, and the size change rule includes size change rules for different types of composition elements on the target user interface when the target user interface changes from the layout manner indicated by the second layout information to the layout manner indicated by the first layout information. That the electronic device generates the first layout information based on the second layout information includes: The electronic device identifies the different types of composition elements on the target user interface, and determines, based on the size change rule, the first layout information corresponding to the target user interface when the target user interface is displayed in the current display region.

In a possible implementation of the first aspect, a target neural network may be preconfigured on the electronic device, and in an inference phase of the target neural network, the target neural network is used by the terminal device to generate the first layout information based on the second layout information by using the target neural network. An input of the target neural network may include the second layout information, and an output of the target neural network may include the first layout information.

In a possible implementation of the first aspect, the method is used in a process of performing a rendering operation on the target user interface by using a browser kernel. In the process of performing the rendering operation on the target user interface, the electronic device may first determine a style of the composition element of the target user interface, determine the target layout information used by the composition element of the target user interface in the target display region, determine the first layout information corresponding to the composition element of the target user interface when the composition element of the target user interface is displayed in the current display region, and then perform compositing update, prepainting (prepaint), painting (paint), or another subsequent step. In other words, the method for processing the user interface of the application provided in this embodiment of this application may be located between the layout and the compositing update in the rendering process.

In this implementation, another specific implementation of this solution is provided, so that an application scenario of this solution is extended, and implementation flexibility of this solution is improved.

In a possible implementation of the first aspect, the target condition includes any one or a combination of the following conditions: A difference between an area of the current display region and an area of the target display region is greater than or equal to a first threshold, or a difference between an aspect ratio of the current display region and an aspect ratio of the target display region is greater than or equal to a second threshold. Further, the "aspect ratio of the current display region" is a ratio between the length of the width side and a length of the height side of the current display region, and the "aspect ratio of the target display region" is a ratio between the length of the width side and the length of the height side of the target display region. Optionally, if the length of the width side of the target display region is less than the length of the width side of the current display region, the target condition may be specifically indicated as that a value of the aspect ratio of the current display region is greater than or equal to a third threshold. In this implementation, a plurality of specific implementations of the target condition are provided, so that implementation flexibility of this solution is improved.

In a possible implementation of the first aspect, if the method for processing the user interface of the application provided in this embodiment of this application is used before a rendering operation is performed, in some implementations, the foregoing method may be performed by a terminal device on which the application is deployed. In some other implementations, the foregoing method may be performed by a server corresponding to the application. If the method for processing the user interface of the application provided in this embodiment of this application is used in a process of performing a rendering operation, the method is performed by a terminal device on which the application is deployed. In this implementation, the method for processing the user interface of the application in this solution may be performed by the terminal device or the server, so that an application scenario of this solution is extended, and implementation flexibility of this solution is improved.

According to a second aspect, an embodiment of this application provides an apparatus for processing a user interface of an application, and the apparatus may be used in the field of computer technologies. The apparatus for processing the user interface of the application includes an obtaining module, configured to obtain a size of a current display region corresponding to the user interface; and a processing module, configured to: when a difference between the size of the current display region and a size of a target display region satisfies a target condition, obtain first layout information corresponding to the user interface when the user interface is displayed in the current display region, where the first layout information indicates a layout manner of a composition element of the user interface in the current display region, the first layout information is obtained based on target layout information used when the user interface is displayed in the target display region, the user interface has a first composition element and a second composition element, and when the user interface changes from a layout manner indicated by the target layout information to the layout manner indicated by the first layout information, a size change ratio of the first composition element is different from a size change ratio of the second composition element.

The apparatus for processing the user interface of the application provided in the second aspect of embodiments of this application may further perform steps performed by the electronic device in the possible implementations of the first aspect. For specific implementation steps of the second aspect and the possible implementations of the second aspect of embodiments of this application, and beneficial effect brought by the possible implementations, refer to the descriptions in the possible implementations of the first aspect. Details are not described herein again.

According to a third aspect, an embodiment of this application provides a computer program product, where the computer program product includes a program, and when the program is run on a computer, the computer is enabled to perform the method for processing the user interface of the application according to the first aspect.

According to a fourth aspect, an embodiment of this application provides a computer-readable storage medium, where the computer-readable storage medium stores a computer program, and when the program is run on a computer, the computer is enabled to perform the method for processing the user interface of the application according to the first aspect.

According to a fifth aspect, an embodiment of this application provides a terminal device, where the terminal device may include a processor, the processor is coupled to a memory, the memory stores program instructions, and when the program instructions stored in the memory are executed by the processor, the method for processing the user interface of the application according to the first aspect is implemented.

According to a sixth aspect, an embodiment of this application provides a server, where the server may include a processor, the processor is coupled to a memory, the memory stores program instructions, and when the program instructions stored in the memory are executed by the processor, the method for processing the user interface of the application according to the first aspect is implemented.

According to a seventh aspect, an embodiment of this application provides a circuit system, where the circuit system includes a processing circuit, and the processing circuit is configured to perform the method for processing the user interface of the application according to the first aspect.

According to an eighth aspect, an embodiment of this application provides a chip system, where the chip system includes a processor, configured to implement functions in the foregoing aspects, for example, sending or processing data and/or information in the foregoing method. In a possible design, the chip system further includes a memory. The memory is configured to store program instructions and data that are necessary for a server or a communication device. The chip system may include a chip, or may include a chip and another discrete component.

DESCRIPTION OF EMBODIMENTS

In the specification, claims, and accompanying drawings of this application, terms "first", "second", and the like are intended to distinguish between similar objects but do not necessarily indicate a specific order or sequence. It should be understood that the terms used in such a way are interchangeable in proper cases, which is merely a discrimination manner used when objects having a same attribute are described in embodiments of this application. In addition, terms "include", "have" and any other variants thereof mean to cover non-exclusive inclusion, so that a process, method, system, product, or device that includes a series of units is not necessarily limited to those units, but may include other units not expressly listed or inherent to such a process, method, product, or device.

The following describes embodiments of this application with reference to the accompanying drawings. A person of ordinary skill in the art may learn that, with the development of technologies and emergence of new scenarios, technical solutions provided in embodiments of this application are also applicable to a similar technical problem.

Figure 1A:
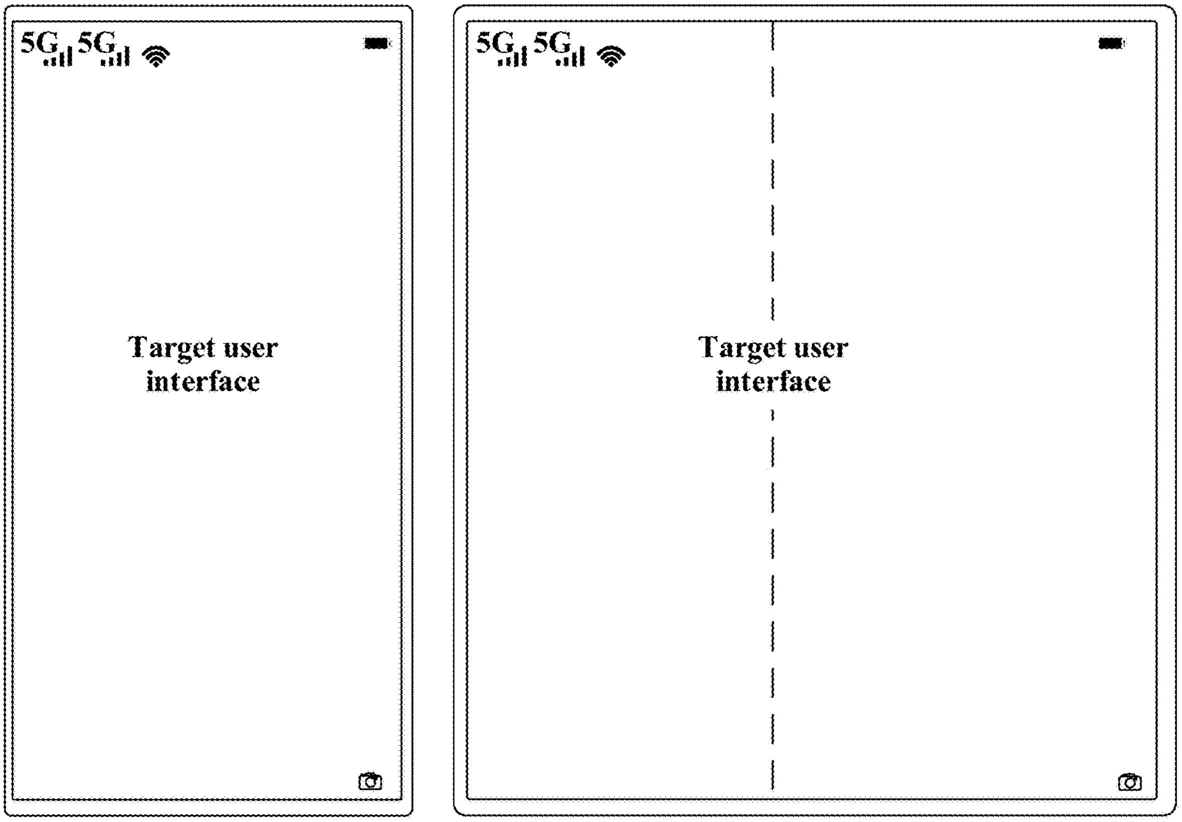
FIG. 1*a* is a diagram of an application scenario of a method for processing a user interface of an application according to an embodiment of this application.

Embodiments of this application may be applied to various application scenarios in which a user interface of an application needs to be displayed in display regions of different specifications. Specifically, in some application scenarios, after an application is deployed on a determined terminal device, a user interface of the application may need to be displayed in display regions of different specifications. For example, FIG. 1*a* is a diagram of an application scenario of a method for processing a user interface of an application according to an embodiment of this application. In FIG. 1*a*, an example in which the application is deployed on a mobile phone with a foldable screen is used. As shown in FIG. 1*a*, if a target user interface of the application is displayed on the entire screen of the terminal device, when a user adjusts the mobile phone from a state of a left sub-diagram in FIG. 1*a* to a state of a right sub-diagram in FIG. 1*a*, that is, when the foldable screen of the mobile phone is opened, a specification of a display region used to display the target user interface of the application changes greatly.

Figure 1B:
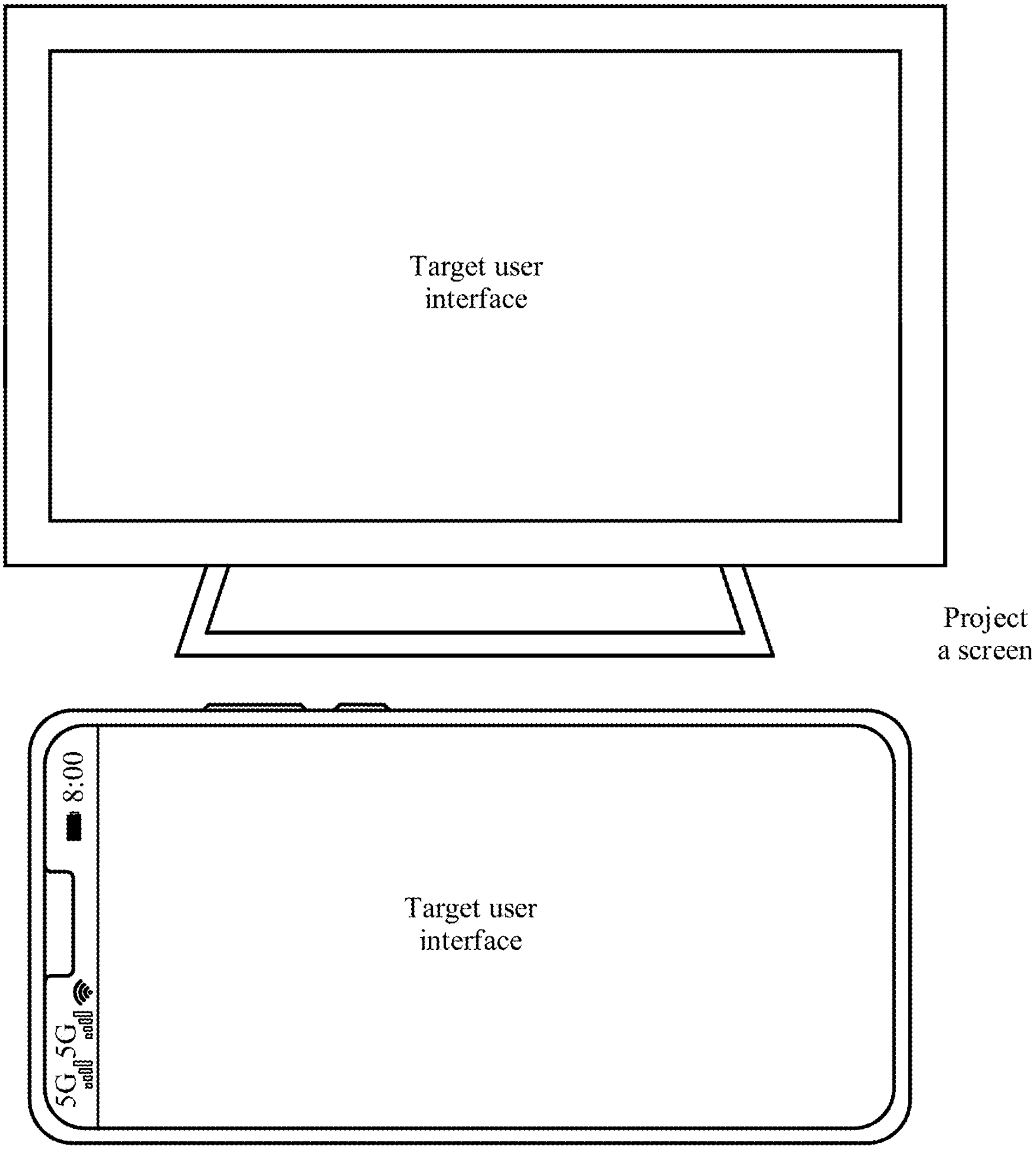
FIG. 1*b* is a diagram of an application scenario of a method for processing a user interface of an application according to an embodiment of this application.

For another example, FIG. 1*b* is a diagram of an application scenario of a method for processing a user interface of an application according to an embodiment of this application. For example, as shown in FIG. 1*b*, when a user interface of the application is projected from a mobile phone end to a television end, a specification of a display region used to display a user interface of the application changes greatly.

In some other application scenarios, a same application may be deployed on terminal devices with different screen specifications. As a result, a same application interface of one application also needs to be displayed in display regions of different specifications.

It should be noted that the foregoing examples are merely used to facilitate understanding of the application scenarios of this solution, and are not used to exhaustively list application scenarios of this solution. Because the user interface of the same application needs to be displayed in the display regions of different specifications, if a person skilled in the art develops the application of one type of layout information for the display region of each specification, the same application needs to be developed in a plurality of versions to adapt to screens of different specifications. This greatly increases development difficulty of the person skilled in the art.

Figure 2:
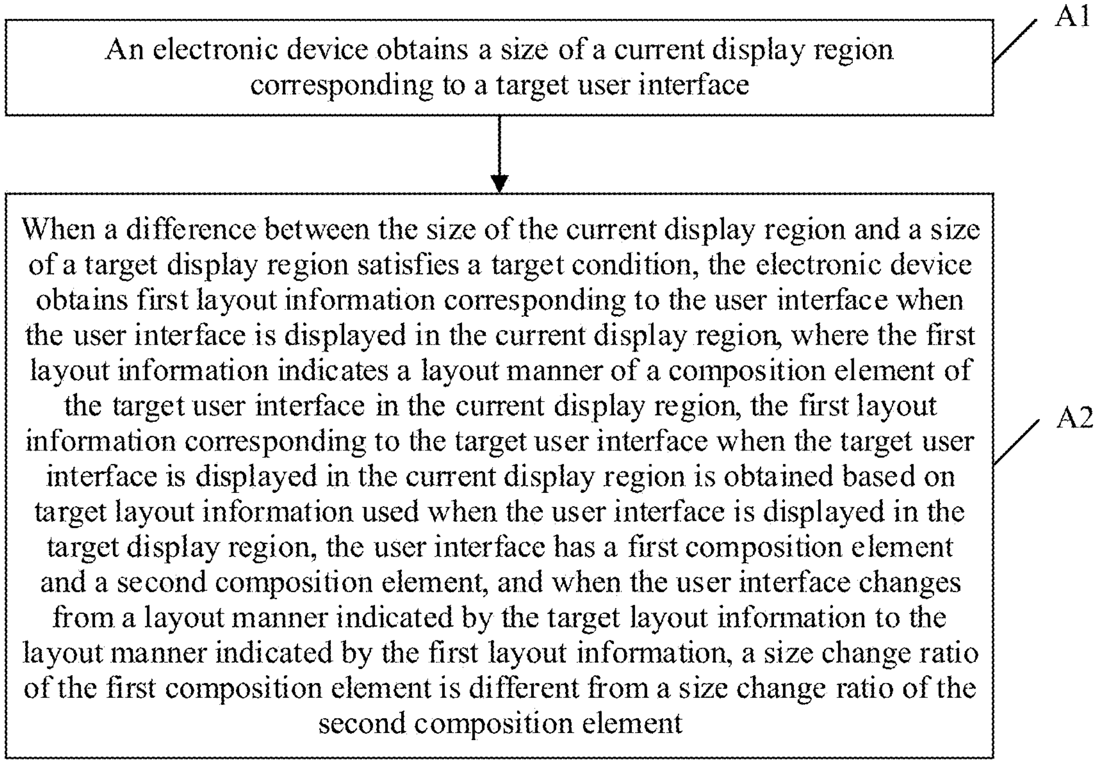
FIG. 2 is a schematic flowchart of a method for processing a user interface of an application according to an embodiment of this application.

To resolve the foregoing problem, embodiments of this application provide a method for processing a user interface of an application. Specifically, FIG. 2 is a schematic flowchart of a method for processing a user interface of an application according to an embodiment of this application. A1: An electronic device obtains a size of a current display region corresponding to a target user interface. A2: When a difference between the size of the current display region and a size of a target display region satisfies a target condition, the electronic device obtains first layout information corresponding to the user interface when the user interface is displayed in the current display region, where the first layout information indicates a layout manner of a composition element of the target user interface in the current display region, the first layout information corresponding to the target user interface when the target user interface is displayed in the current display region is obtained based on target layout information used when the user interface is displayed in the target display region, the user interface has a first composition element and a second composition element, and when the user interface changes from a layout manner indicated by the target layout information to the layout manner indicated by the first layout information, a size change ratio of the first composition element is different from a size change ratio of the second composition element.

In embodiments of this application, when the user interface needs to be displayed in a display region of another size, layout information of the user interface in the target display region may be changed. To be specific, a developer only needs to design the layout information of the user interface in a display region (namely, the target display region) of one size, which greatly reduces development burden of the person skilled in the art. In addition, when the user interface changes from the layout manner indicated by the target layout information to the layout manner indicated by the first layout information, the size change ratio of the first composition element and the size change ratio of the second composition element on the user interface may be different, that is, not all composition elements on the user interface are uniformly zoomed in/out, which helps improve adaptation between the target layout information and the target display region.

To facilitate understanding of this solution, before the method for processing the user interface of the application provided in embodiments of this application is described in detail, the following first describes related terms and concepts in embodiments of this application.

(1) User Interface

The user interface is a man-machine interaction interface, of an application, displayed on a screen of a terminal device. The user interface may be a web user interface or a native user interface. Information about the web user interface is sent to the terminal device by a server corresponding to the application, and information about the native user interface is directly generated by the terminal device.

(2) Current Display Region Corresponding to a User Interface

The current display region corresponding to the user interface may also be referred to as a current view of the user interface. Because a partial region of an entire screen of a terminal device may be used to display the user interface, or the entire screen of the terminal device may be used to display the user interface, the "current display region corresponding to the user interface" is a region used to display the user interface on the screen of the terminal device.

(3) Target Display Region

A person skilled in the art may design a target layout manner of a target user interface in the target display region based on a size of the target display region, so that when the target user interface is displayed in any current display region, a layout manner of the target user interface in the current display region may be obtained based on the layout manner of the target user interface in the target display region.

(4) Process of Performing a Rendering Operation by Using a Browser Kernel

When a user interface is a web user interface, the process of performing the rendering (Render) operation by using the browser kernel is a process of generating a visual user interface based on data that describes the user interface, and the data that describes the user interface describes elements on the user interface by using a strictly defined data structure or language, and includes a geometric shape, a texture, a location, or other information of the elements on the user interface. For example, when a user interface is a web user interface, the data that describes the user interface may specifically include a hypertext markup language (HTML) file, a cascading style sheets (CSS) style, and the like. Content specifically included in the "data that describes the user interface" is not listed exhaustively herein.

The process of performing rendering (Render) on the user interface may include determining a style of a composition element of the user interface, determining a layout of the composition element of the user interface, and performing compositing update, prepainting (prepaint), painting (paint), or another step. Details are not listed herein one by one.

With reference to the foregoing description, specifically, in some implementations, the method for processing the user interface of the application provided in embodiments of this application may be used before the rendering operation is performed. In some other implementations, the method for processing the user interface of the application provided in embodiments of this application may be used in the process of performing the rendering operation. Because implementation procedures corresponding to the foregoing two implementations are different, specific implementation procedures of the foregoing three specific implementations are separately described in detail below.

1. Used Before a Rendering Operation is Performed

In embodiments of this application, if the method for processing the user interface of the application provided in embodiments of this application is used before the rendering operation is performed, in some implementations, the foregoing method may be performed by a terminal device on which the application is deployed. In some other implementations, the foregoing method may be performed by a server corresponding to the application. The following separately describes the foregoing two cases.

(1) The Method is Performed by a Terminal Device.

Figure 3:
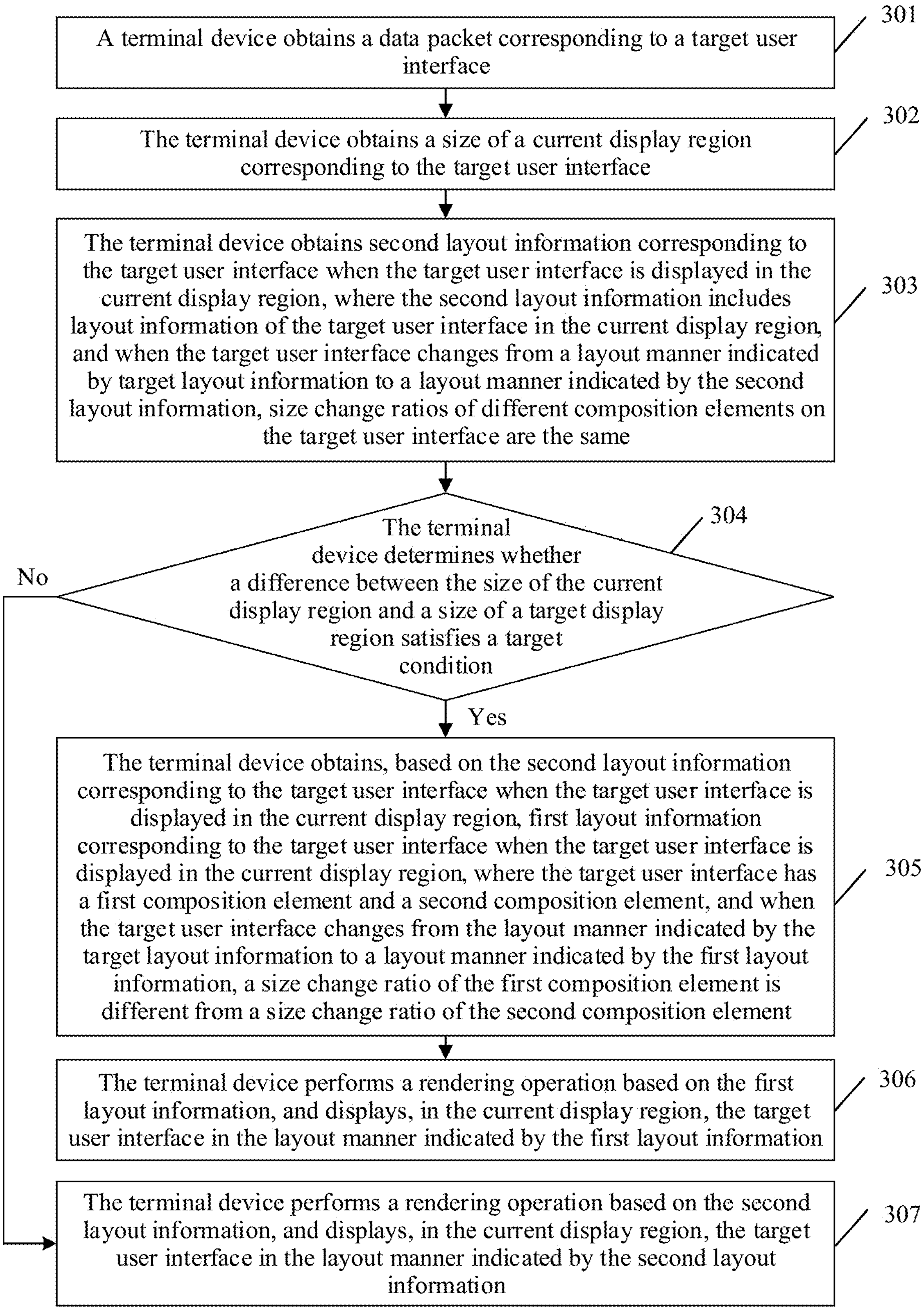
FIG. 3 is a schematic flowchart of a method for processing a user interface of an application according to an embodiment of this application.

In this embodiment of this application, when a target user interface is a web user interface or a native user interface, the following method for processing a user interface of an application may be used. Specifically, FIG. 3 is a schematic flowchart of the method for processing the user interface of the application according to this embodiment of this application. The method for processing the user interface of the application provided in this embodiment of this application may include the following steps.

301: The terminal device obtains a data packet corresponding to the target user interface.

In this embodiment of this application, the terminal device may obtain the data packet corresponding to the target user interface. Specifically, in some cases, the target user interface is the web user interface, and when a new user interface (namely, the target user interface) needs to be displayed on the terminal device, request information may be sent to a server. The server sends, in response to the received request information, the data packet corresponding to the target user interface to the terminal device.

In some other cases, the target user interface is the native user interface. When a new user interface (namely, the target user interface) needs to be displayed on the terminal device, the terminal device may directly generate the data packet corresponding to the target user interface.

The data packet corresponding to the target user interface indicates content of the target user interface of the terminal device, and may include target layout information and related program code that are used when the target user interface is displayed in a target display region. For example, the data packet corresponding to the target user interface may include an HTML file, a CSS style, and scripting language (JavaScript) code, for example. It should be noted that, when the target user interface is the web user interface, with the development of technologies, the data packet corresponding to the target user interface may also change. The example herein is merely used to facilitate understanding of this solution, and is not intended to limit this solution.

302: The terminal device obtains a size of a current display region corresponding to the target user interface.

In this embodiment of this application, when the terminal device needs to display the new user interface (namely, the target user interface) in the current display region, the terminal device needs to obtain the size of the current display region corresponding to the target user interface.

The size of the current display region includes a length of a width side of the current display region and a length of a height side of the current display region, the width side of the current display region and the height side of the current display region are two sides that are not parallel to each other, and a length of a width side of the target display region is less than a length of a height side of the target display region. Usually, when the target user interface is displayed in the current display region, a sliding function does not exist on the width side of the current display region, and the sliding function exists on the height side of the current display region.

Figure 4:
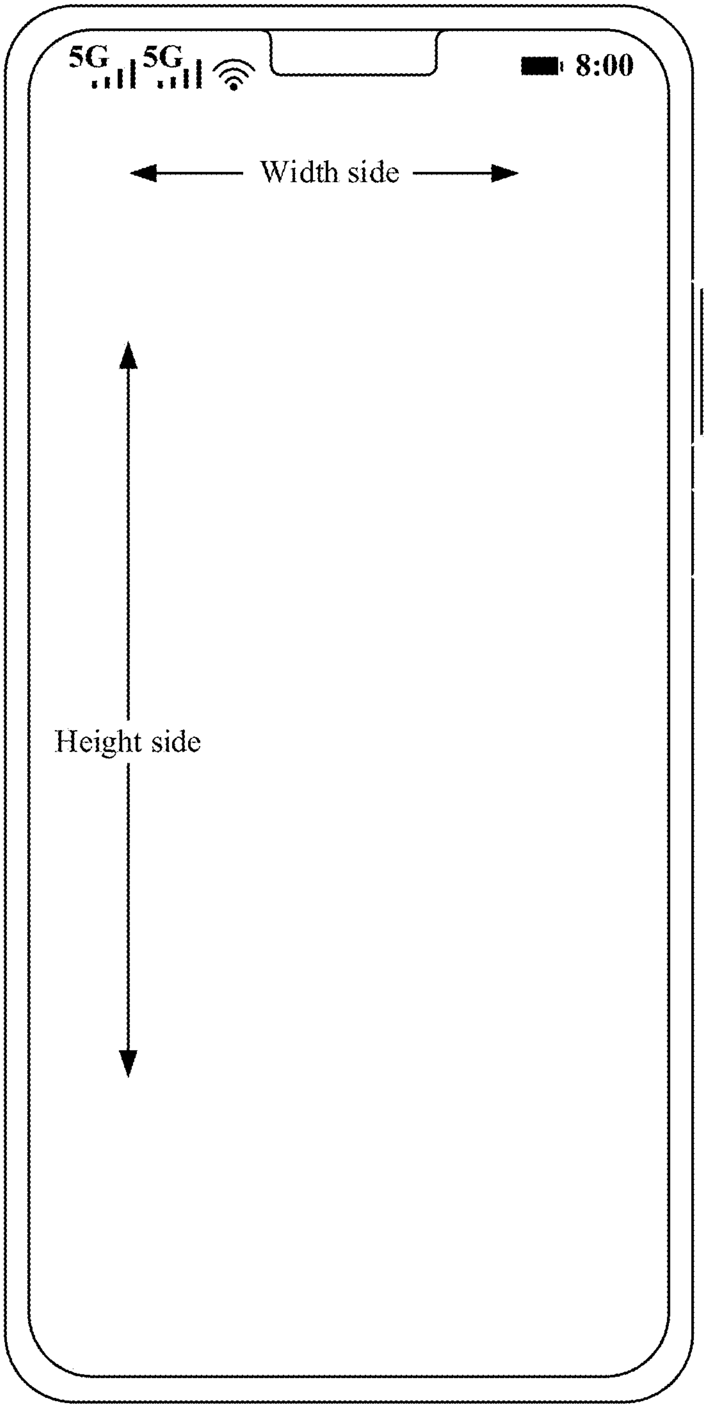
FIG. 4 is a diagram of a width side and a height side of a current display region in a method for processing a user interface of an application according to an embodiment of this application.

For more intuitive understanding of this solution, FIG. 4 is a diagram of the width side and the height side of the current display region in the method for processing the user interface of the application according to this embodiment of this application. FIG. 4 uses an example in which an entire screen of the terminal device is the current display region. FIG. 4 shows the width side and the height side of the current display region. It should be understood that the example in FIG. 4 is merely used to facilitate understanding of this solution, and is not intended to limit this solution.

It should be noted that an execution sequence of steps 301 and 302 is not limited in this embodiment of this application. Step 301 may be performed first, and then step 302 is performed. Alternatively, step 302 may be performed first, and then step 301 is performed. Alternatively, step 301 and step 302 may be performed simultaneously.

303: The terminal device obtains second layout information corresponding to the target user interface when the target user interface is displayed in the current display region, where the second layout information includes layout information of the target user interface in the current display region, and when the target user interface changes from a layout manner indicated by the target layout information to a layout manner indicated by the second layout information, size change ratios of different composition elements on the target user interface are the same.

In this embodiment of this application, if the method for processing the target user interface of the application provided in this embodiment of this application is used before the rendering operation is performed, after obtaining the size of the current display region corresponding to the target user interface, the terminal device may generate, based on the target layout information used when the target user interface is displayed in the target display region, the second layout information corresponding to the target user interface when the target user interface is displayed in the current display region.

When the user interface changes from the layout manner indicated by the target layout information to the layout manner indicated by the second layout information, the size change ratios of the different composition elements on the user interface are the same.

Both the "target layout information" and the "second layout information" are layout information corresponding to the target user interface. If the method for processing the target user interface of the application provided in this embodiment of this application is used before the rendering operation is performed, the "layout information corresponding to the target user interface" includes information required for performing the rendering operation on the target user interface.

For example, if the target user interface is the web user interface, the "layout information corresponding to the target user interface" may include the HTML file and the CSS style. For another example, for example, the target user interface is the native user interface, and the "layout information corresponding to the target user interface" may be an extensible markup language (XML) file, the CSS style, and the like. This is not listed exhaustively herein.

The "size change ratio of the composition element of the user interface" includes a change ratio of the composition element of the user interface on a width side and a change ratio of the composition element of the user interface on a height side. The "size change ratio of the composition element of the user interface" may be a zoom-in or zoom-out ratio of the composition element of the user interface.

Further, the zoom-in/out ratio of the composition element of the user interface on the width side and the height side may be the same as or different from a target ratio, and the target ratio includes a ratio of the length of the width side of the current display region to the length of the width side of the target display region, and a ratio of the length of the height side of the current display region to the length of the height side of the target display region.

Optionally, the length of the width side of the target display region is less than the length of the width side of the current display region. When the target user interface is displayed in the target display region, the sliding function does not exist on the width of the target display region, and the sliding function exists on the height of the target display region. For understanding of the three concepts "target display region", "current display region", and "width", refer to the foregoing description. Details are not described herein again. Correspondingly, the "size change ratio of the composition element of the user interface" is the zoom-in ratio of the composition element of the user interface.

Figure 5:
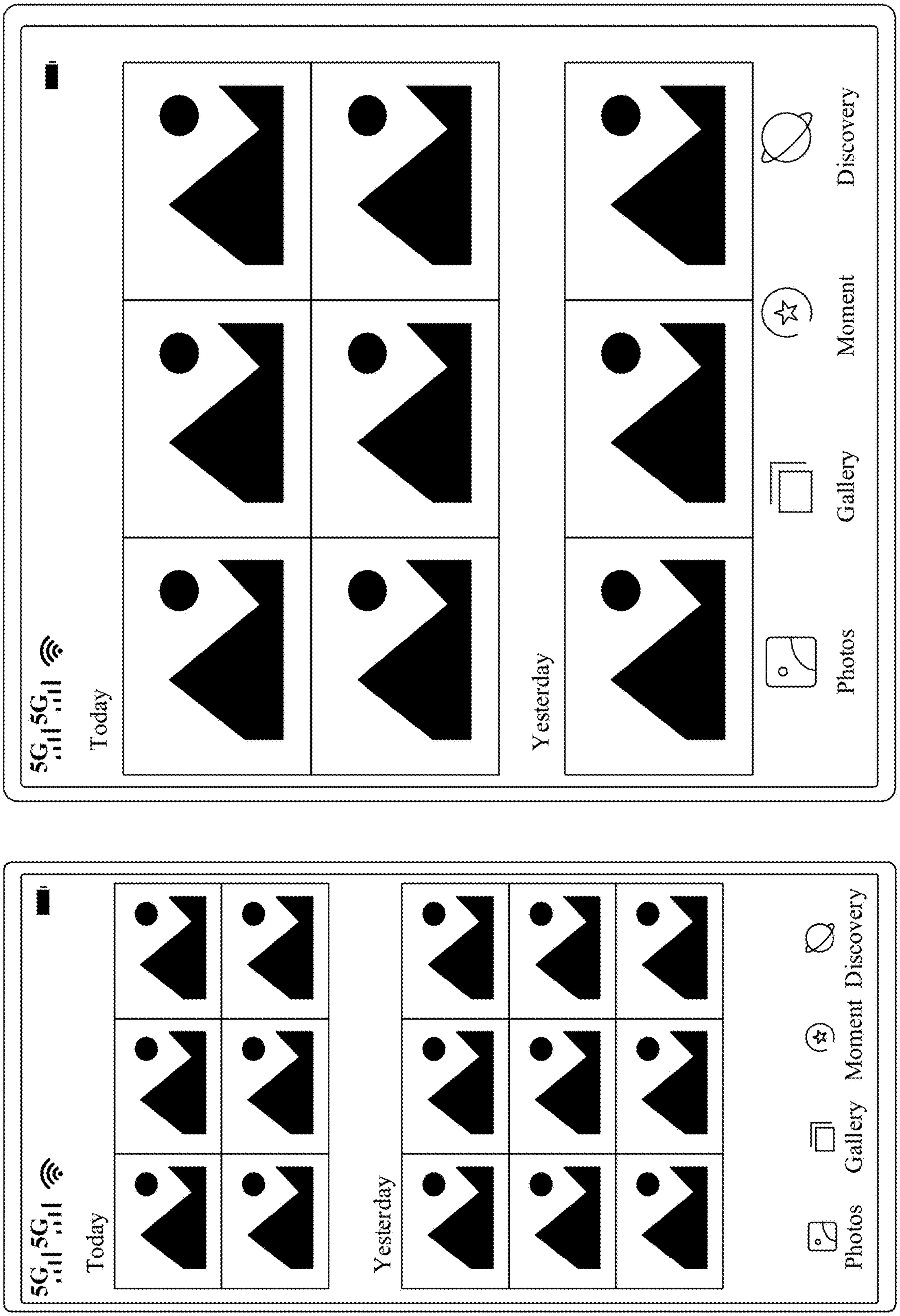
FIG. 5 is a diagram of layout manners corresponding to target layout information and second layout information in a method for processing a user interface of an application according to an embodiment of this application.

For more intuitive understanding of this solution, FIG. 5 is a diagram of the layout manners corresponding to the target layout information and the second layout information in the method for processing the user interface of the application according to this embodiment of this application. In FIG. 5, an example in which the length of the width side of the target display region is less than the length of the width side of the current display region is used. A left sub-diagram in FIG. 5 is a diagram of the layout manner indicated by the target layout information, and a right sub-diagram in FIG. 5 is a diagram of the layout manner indicated by the second layout information. As shown in FIG. 5, when the target user interface changes from the layout manner indicated by the target layout information to the layout manner indicated by the second layout information, the size change ratios of the different composition elements on the target user interface are the same. It should be understood that the example in FIG. 5 is merely used to facilitate understanding of this solution, and is not intended to limit this solution.

In this embodiment of this application, a person skilled in the art finds in design that difficulty in changing the user interface from being displayed on a narrow screen to being displayed on a wide screen is low, and difficulty in changing the user interface from being displayed on a wide screen to being displayed on a narrow screen is high. Therefore, the length of the width side of the target display region is less than the length of the width side of the current display region, and the sliding function does not exist on the width of the target display region, that is, changing from the target display region to the current display region is a process of changing from the narrow screen to the wide screen. This helps reduce difficulty of processing the user interface.

304: The terminal device determines whether a difference between the size of the current display region and a size of the target display region satisfies a target condition; and if a determining result is yes, performs step 305; or if a determining result is no, performs step 307.

In this embodiment of this application, after obtaining the size of the current display region, the terminal device may determine whether the difference between the size of the current display region and the size of the target display region satisfies the target condition; and if the determining result is yes, perform step 305; or if the determining result is no, perform step 307.

The target condition may include any one or a combination of a plurality of the following conditions: A difference between an area of the current display region and an area of the target display region is greater than or equal to a first threshold, a difference between an aspect ratio of the current display region and an aspect ratio of the target display region is greater than or equal to a second threshold, a difference between the length of the width side of the current display region and the length of the width side of the target display region is greater than or equal to a fourth threshold, or another target condition.

Optionally, if the length of the width side of the target display region is less than the length of the width side of the current display region, the target condition may further include that a value of the aspect ratio of the current display region is greater than or equal to a third threshold, that is, the target condition is used to determine whether the current display region is the wide screen, or the like. This is not listed exhaustively herein.

Further, the "aspect ratio of the current display region" is a ratio between the length of the width side and the length of the height side of the current display region, and the "aspect ratio of the target display region" is a ratio between the length of the width side and the length of the height side of the target display region.

The "difference between the area of the current display region and the area of the target display region" may be a difference value between the area of the current display region and the area of the target display region, a ratio between the area of the current display region and the area of the target display region, another processing manner, or the like. Correspondingly, the "difference between the aspect ratio of the current display region and the aspect ratio of the target display region" may be a difference value, a ratio, another processing manner, or the like between the aspect ratio of the current display region and the aspect ratio of the target display region. The "difference between the length of the width side of the current display region and the length of the width side of the target display region" may be a difference value, a ratio, another processing manner, or the like between the length of the width side of the current display region and the length of the width side of the target display region. This is not listed exhaustively herein.

In this embodiment of this application, a plurality of specific implementations of the target condition are provided, so that implementation flexibility of this solution is improved.

It should be noted that an execution sequence of steps 303 and 304 is not limited in this embodiment of this application. Step 303 may be performed first, and then step 304 is performed. Alternatively, step 304 may be performed first, and then step 303 is performed. Alternatively, step 303 and step 304 may be performed simultaneously.

305: The terminal device obtains, based on the second layout information corresponding to the target user interface when the target user interface is displayed in the current display region, first layout information corresponding to the target user interface when the target user interface is displayed in the current display region, where the target user interface has a first composition element and a second composition element, and when the target user interface changes from the layout manner indicated by the target layout information to a layout manner indicated by the first layout information, a size change ratio of the first composition element is different from a size change ratio of the second composition element.

In this embodiment of this application, the terminal device may obtain, based on the second layout information corresponding to the target user interface when the target user interface is displayed in the current display region, the first layout information corresponding to the target user interface when the target user interface is displayed in the current display region.

The target user interface has the first composition element and the second composition element, and when the target user interface changes from the layout manner indicated by the target layout information to the layout manner indicated by the first layout information, the size change ratio of the first composition element is different from the size change ratio of the second composition element. When the target user interface changes from the layout manner indicated by the second layout information to the layout manner indicated by the first layout information, the size change ratios of the different composition elements on the target user interface are the same. Therefore, when the target user interface changes from the layout manner indicated by the second layout information to the layout manner indicated by the first layout information, the size change ratio of the first composition element is different from the size change ratio of the second composition element.

Specifically, in an implementation, a size change rule is configured on the terminal device, and the size change rule includes size change rules for different types of composition elements on the target user interface when the target user interface changes from the layout manner indicated by the second layout information to the layout manner indicated by the first layout information. In this case, in step 305, the terminal device needs to identify the different types of composition elements on the target user interface, and determine, based on the size change rule, the first layout information corresponding to the target user interface when the target user interface is displayed in the current display region.

For example, any combination of a plurality of the following elements may exist on the target user interface: a list element, a large image element, an absolutely positioned and disorderly arranged rectangular box element, a masonry element, or another element. For example, a composition element whose size does not need to be updated may further exist on the target user interface, for example, a head floating box element, a bottom floating box element, or another composition element. This is not listed exhaustive herein.

The list element may include a plurality of composition elements that are on the target user interface and that have a same width and height and that have similar element structure information. The large image element may include a composition element that is on the target user interface and whose length of a width side exceeds a first ratio of the width side of the current display region, and whose length of a height side exceeds a second ratio of the height side of the current display region.

Further, for the size change rules for the different types of composition elements, for example, when the length of the width side of the target display region is less than the length of the width side of the current display region, the size change rule for the list element may include reducing a width side and a height side of each list element to 1/n of an original width side and an original height side. Further, for a plurality of list elements in a single row, a final structure of the plurality of list elements is still a single row, and spacings between different list elements are of an equal width. For a plurality of rows of list elements, capacity of list elements in each row is n times of original capacity, and spacings are of an equal width.

Optionally, the terminal device may further compare a height of the list element with a height of a parent node of the list element. If a ratio of the height of the parent node of the list element to the height of the list element exceeds m times, the terminal device may readjust the height of the parent node of the list element.

The size change rule for the large image element may include keeping a width of the large image element unchanged, and adjusting a height of the large image element to 1/s of an original height, or adjusting both a height and a width of the large image element to 1/s of an original height and an original width, and filling left and right sides of the large image element with an original image or a solid color image with blur effect.

The size change rule for the absolutely positioned and disorderly arranged rectangular box element may include considering a plurality of absolutely positioned and disorderly arranged rectangular box elements as one large image element. For a specific processing manner, refer to the foregoing description of the processing manner of the large image element. Details are not described herein again.

Figure 6:
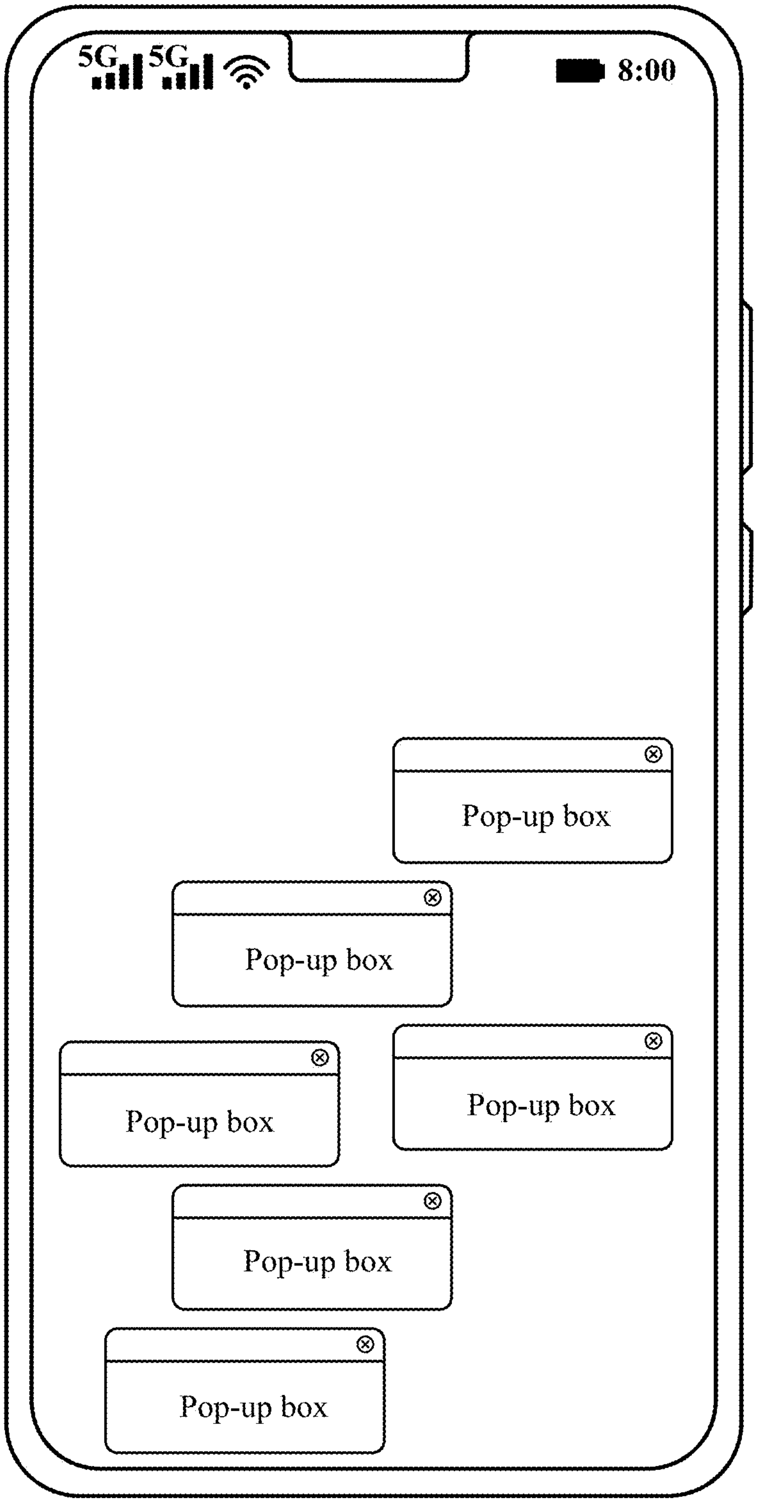
FIG. 6 is a diagram of absolutely positioned and disorderly arranged rectangular box elements in a method for processing a user interface of an application according to an embodiment of this application.

For more intuitive understanding of this solution, FIG. 6 is a diagram of absolutely positioned and disorderly arranged rectangular box elements in the method for processing the user interface of the application according to this embodiment of this application. A plurality of pop-up boxes shown in FIG. 6 represent a plurality of absolutely positioned and disorderly arranged rectangular box elements. It should be understood that the example in FIG. 6 is merely used to facilitate understanding of this solution, and is not intended to limit this solution.

The change rule for the masonry element may include reducing a width side of each masonry element based on a preset ratio, and increasing a quantity of columns of masonries deployed on the width side of the current display region.

Figure 7:
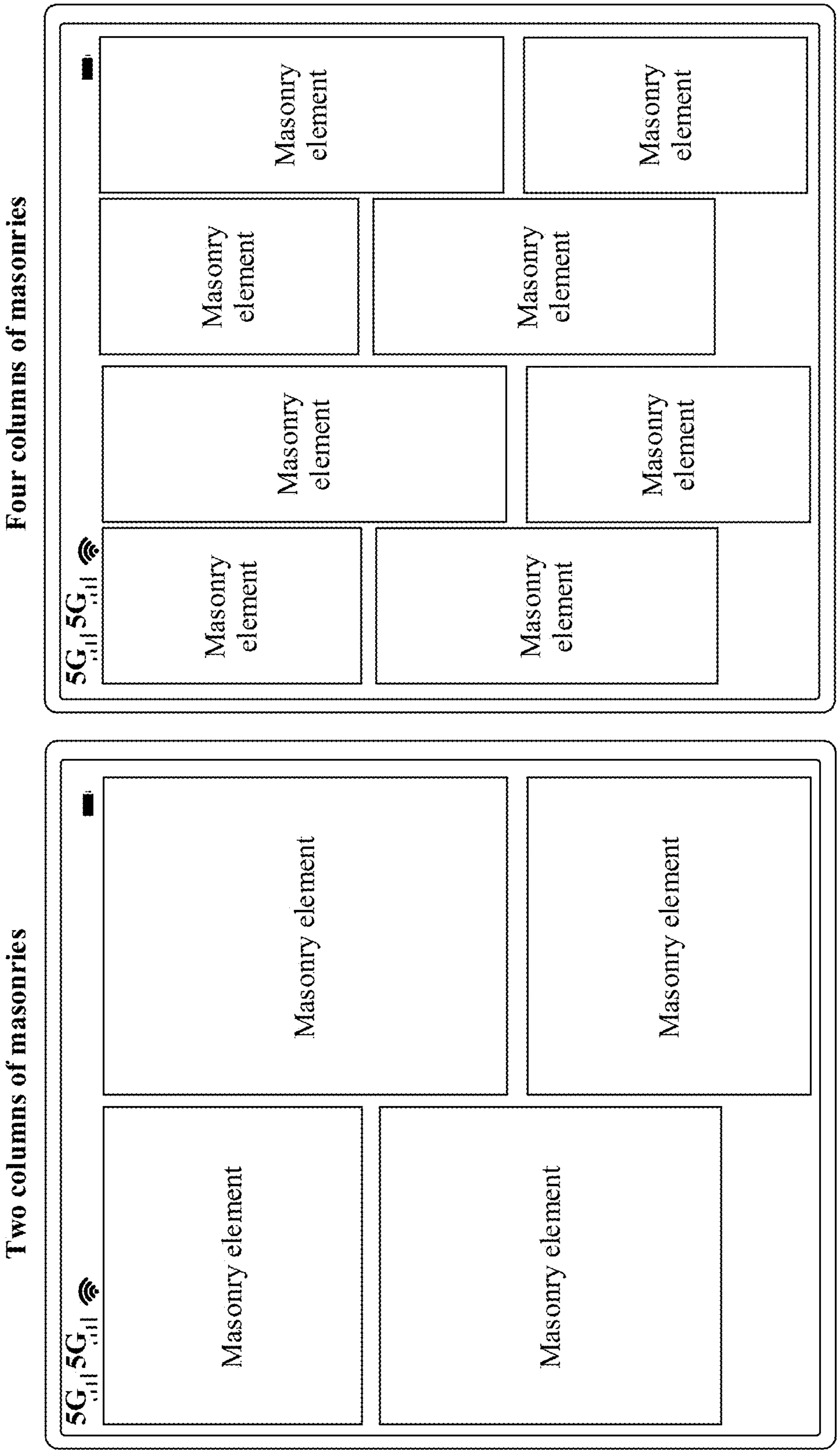
FIG. 7 is a diagram of masonry elements in a method for processing a user interface of an application according to an embodiment of this application.

For more intuitive understanding of this solution, FIG. 7 is a diagram of masonry elements in the method for processing the user interface of the application according to this embodiment of this application. FIG. 7 includes two sub-diagrams: a left sub-diagram and a right sub-diagram. The left sub-diagram in FIG. 7 shows a layout manner of the masonries in the layout manner indicated by the second layout information, and the right sub-diagram in FIG. 7 shows a layout manner of the masonries in the layout manner indicated by the first layout information. Compared with the layout manner indicated by the second layout information and the layout manner indicated by the first layout information, a width side of each masonry element is reduced to half of an original width side, and a quantity of columns of the masonries is increased by two times. It should be understood that the example in FIG. 7 is merely used to facilitate understanding of this solution, and is not intended to limit this solution.

It should be noted that the foregoing examples of the composition elements of the target user interface and the foregoing examples of the change rule of each type of composition element are merely used to facilitate understanding of feasibility of this solution. Types of composition elements into which the user interface is classified and a change rule of each type of composition element may be flexibly set with reference to an actual application scenario. This is not limited herein.

In another implementation, a target neural network may be preconfigured on the terminal device, and in an inference phase of the target neural network, the target neural network is used by the terminal device to generate the first layout information based on the second layout information by using the target neural network. An input of the target neural network may include the second layout information, and an output of the target neural network may include the first layout information. It should be understood that both the "first layout information" and the "second layout information" are layout information. For understanding of a concept of the "layout information", refer to the description in step 303. Details are not described herein again.

In a training phase of the target neural network, a training data set may be pre-stored on a training device of the target neural network. The training data set includes a plurality of pieces of training data, and each training data packet includes second layout information corresponding to the target user interface and correct first layout information corresponding to the target user interface. The training device of the target neural network inputs the second layout information corresponding to the user interface to the target neural network, to obtain predicted first layout information output by the target neural network. The training device of the target neural network generates a function value of a loss function based on the predicted first layout information and the correct first layout information, and reversely updates a weight parameter of the target neural network based on the function value of the loss function, to complete training of the target neural network once. The training device of the target neural network performs iterative training on the target neural network until a convergence condition is satisfied, to obtain a trained target neural network, and the trained target neural network is deployed on the terminal device. The loss function indicates a similarity between the predicted first layout information and the correct first layout information. The convergence condition may be that a convergence condition of the loss function is satisfied, or may be that a quantity of iterations reaches a preset quantity of times.

Figure 8:
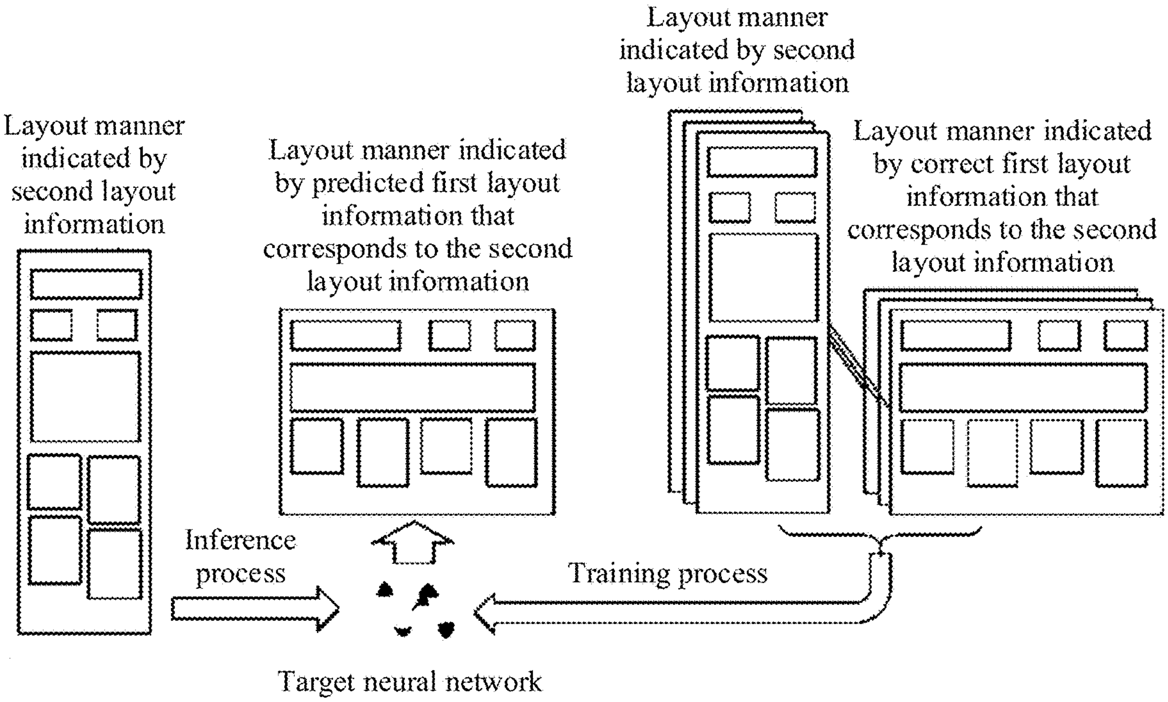
FIG. 8 is a diagram of a training phase and an inference phase of a target neural network in a method for processing a user interface of an application according to an embodiment of this application.

For more direct understanding of this solution, FIG. 8 is a diagram of the training phase and the inference phase of the target neural network in the method for processing the user interface of the application according to this embodiment of this application. As shown in FIG. 8, in the training phase of the target neural network, each piece of training data includes the second layout information corresponding to the target user interface and the correct first layout information corresponding to the target user interface. Therefore, the iterative training can be performed on the target neural network by using the plurality of pieces of training data. In the inference result of the target neural network, the second layout information corresponding to the target user interface is input to the trained target neural network, to obtain the predicted first layout information that is output by the target neural network and that corresponds the second layout information. It should be noted that, although schematic block widths of the layout manner corresponding to the second layout information and the layout manner indicated by the first layout information are different in FIG. 8, in an actual case, the second layout information and the first layout information are layout information for a same display region, that is, the schematic block widths of the layout manner corresponding to the second layout information and the layout manner indicated by the first layout information should be the same. It should be understood that the example in FIG. 8 is merely used to facilitate understanding of this solution, and is not intended to limit this solution.

306: The terminal device performs the rendering operation based on the first layout information, and displays, in the current display region, the target user interface in the layout manner indicated by the first layout information.

In this embodiment of this application, step 304 is an optional step. If step 304 is not performed, steps 305 and 306 may be directly performed after step 303 is performed; or if step 304 is performed, when the determining result is yes, steps 305 and 306 are triggered to be performed. Specifically, after obtaining the first layout information corresponding to the target user interface when the target user interface is displayed in the current display region in step 305, the terminal device may perform the rendering operation based on the first layout information, and then display, in the current display region, the target user interface in the layout manner indicated by the first layout information. For understanding of a concept of the "rendering operation", refer to the foregoing description. Details are not described herein again.

307: The terminal device performs a rendering operation based on the second layout information, and displays, in the current display region, the target user interface in the layout manner indicated by the second layout information.

In this embodiment of this application, step 304 is an optional step. If step 304 is not performed, step 307 does not need to be performed; or if step 304 is performed, when the determining result is no, step 307 is triggered to be performed. Specifically, the terminal device may perform the rendering operation based on the second layout information, and further, display, in the current display region, the target user interface in the layout manner indicated by the second layout information. For understanding of the concept of the "rendering operation", refer to the foregoing description. Details are not described herein again.

Figure 9:
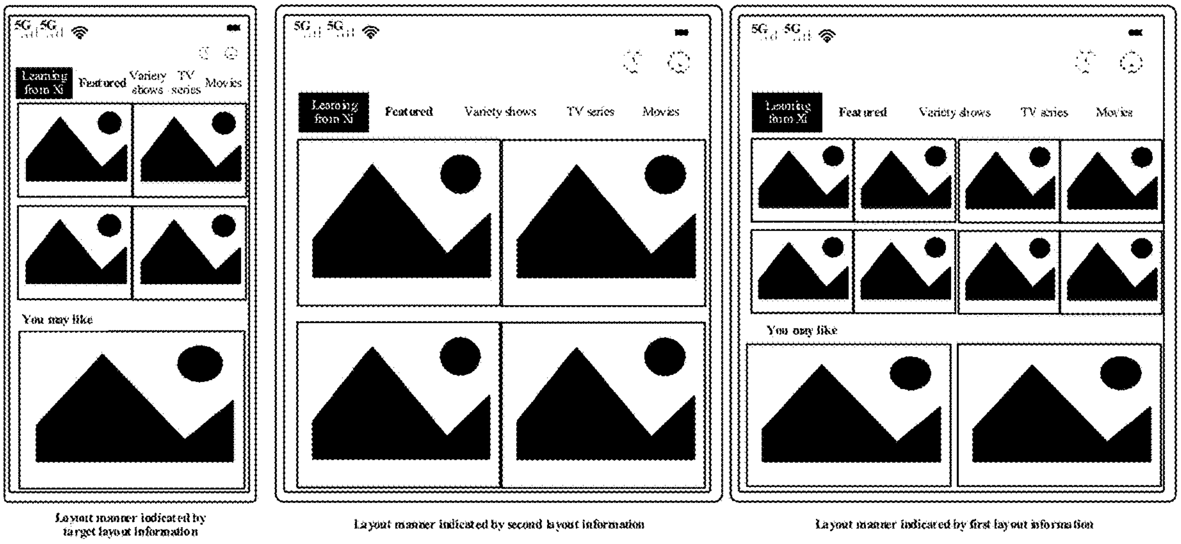
FIG. 9 is a diagram of layout manners corresponding to target layout information, second layout information, and first layout information in a method for processing a user interface of an application according to an embodiment of this application.

For more intuitive understanding of this solution, FIG. 9 is a diagram of the layout manners corresponding to the target layout information, the second layout information, and the first layout information in the method for processing the user interface of the application according to this embodiment of this application. As shown in FIG. 9, the layout manner corresponding to the target layout information is compared with the layout manner corresponding to the second layout information, and the size change ratios of the different composition elements on the target user interface are the same. The layout manner corresponding to the target layout information is compared with the layout manner corresponding to the first layout information, and the composition elements with different size change ratios exist on the target user interface. The layout manner corresponding to the second layout information is compared with the layout manner corresponding to the first layout information, and adaptation between the layout manner corresponding to the first layout information and the current display region is higher. It should be understood that the example in FIG. 9 is merely used to facilitate understanding of this solution, and is not intended to limit this solution.

It should be noted that the method for processing the user interface of the application provided in embodiments of this application may be specifically indicated in a form of program code. In the embodiment corresponding to FIG. 3, if the target user interface is the web user interface, in one case, the program code may be sent to the terminal device by the server corresponding to the application. In another case, the program code may be added to the application deployed on the terminal device in a version upgrade manner. In another case, the terminal device may further add the program code and the like in a code injection manner. If the target user interface is the native user interface, in another case, the program code may be added to the application deployed on the terminal device in the version upgrade manner. In another case, the terminal device may further add the program code or the like in the code injection manner. This should be specifically determined with reference to an actual application scenario. This is not limited herein.

Further, in the embodiment corresponding to FIG. 3, when the target user interface is the web user interface, steps 302 to 307 may be performed by a browser kernel (rendering engine) on the terminal device. The browser kernel may be a browser kernel in an operating system of the terminal device, may be a browser kernel carried in the application, or the like.

(2) The Method is Performed by a Server.

Figure 10:
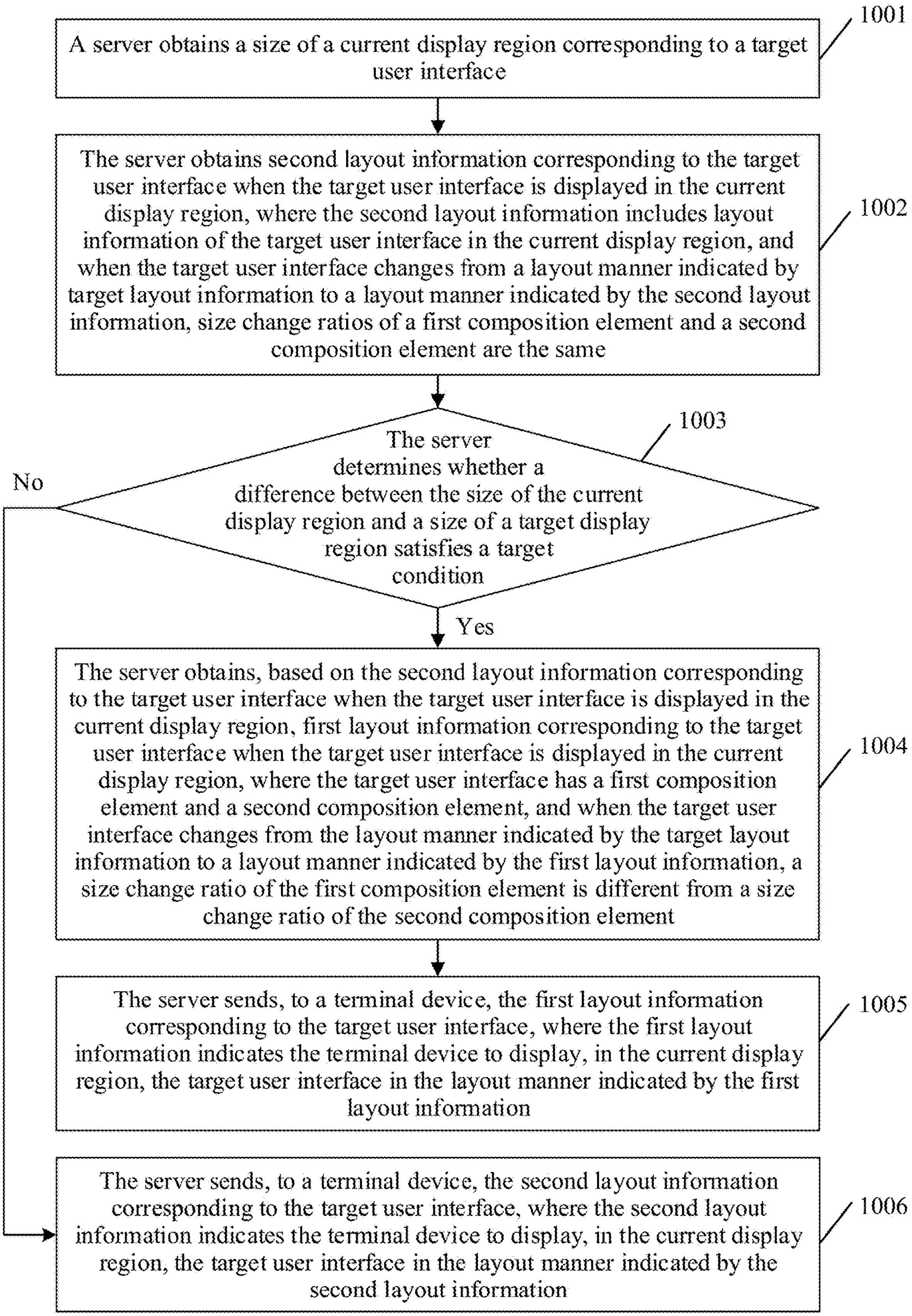
FIG. 10 is a schematic flowchart of a method for processing a user interface of an application according to an embodiment of this application.

In this embodiment of this application, if a target user interface is a web user interface, the method for processing the user interface of the application provided in embodiments of this application may alternatively be performed by the server. Specifically, FIG. 10 is a schematic flowchart of a method for processing a user interface of an application according to an embodiment of this application. The method for processing the user interface of the application provided in this embodiment of this application may include the following steps.

1001: The server obtains a size of a current display region corresponding to the target user interface.

In some embodiments of this application, if the server corresponding to the application performs the method for processing the user interface of the application provided in this embodiment of this application, when a new target user interface needs to be displayed on a terminal device, request information may be sent to the server. The request information carries the size of the current display region corresponding to the target user interface, and the request information indicates the server to send, to the terminal device, the target user interface that adapts to the current display region.

For understanding of a concept of the "size of the current display region", refer to the foregoing description. Details are not described herein again.

1002: The server obtains second layout information corresponding to the target user interface when the target user interface is displayed in the current display region, where the second layout information includes layout information of the target user interface in the current display region, and when the target user interface changes from a layout manner indicated by the target layout information to a layout manner indicated by the second layout information, size change ratios of different composition elements on the target user interface are the same.

In some embodiments of this application, the server may generate, based on the target layout information used when the target user interface is displayed in a target display region, the second layout information corresponding to the target user interface when the target user interface is displayed in the current display region. The second layout information includes the layout information of the target user interface in the current display region. When the target user interface changes from the layout manner indicated by the target layout information to the layout manner indicated by the second layout information, the size change ratios of the different composition elements on the target user interface are the same. Further, for meanings of concepts in step 1002, refer to the description in step 303 in the embodiment corresponding to FIG. 3. Details are not described herein again.

1003: The server determines whether a difference between the size of the current display region and a size of the target display region satisfies a target condition; and if a determining result is yes, performs step 1004; or if a determining result is no, performs step 1006.

1004: The server obtains, based on the second layout information corresponding to the target user interface when the target user interface is displayed in the current display region, first layout information corresponding to the target user interface when the target user interface is displayed in the current display region, where the target user interface has a first composition element and a second composition element, and when the target user interface changes from the layout manner indicated by the target layout information to a layout manner indicated by the first layout information, a size change ratio of the first composition element is different from a size change ratio of the second composition element.

In this embodiment of this application, for specific implementations of steps 1003 and 1004, refer to the descriptions in steps 304 and 305 in the embodiment corresponding to FIG. 3. A difference lies in that the embodiment corresponding to FIG. 3 is performed by the terminal device, and the method in the embodiment corresponding to FIG. 10 is performed by the server.

It should be noted that an execution sequence of steps 1003 and 1004 is not limited in this embodiment of this application. Step 1003 may be performed first, and then step 1004 is performed. Alternatively, step 1004 may be performed first, and then step 1003 is performed. Alternatively, step 1003 and step 1004 may be performed simultaneously.

1005: The server sends, to the terminal device, the first layout information corresponding to the target user interface, where the first layout information indicates the terminal device to display, in the current display region, the target user interface in the layout manner indicated by the first layout information.

1006: The server sends, to the terminal device, the second layout information corresponding to the target user interface, where the second layout information indicates the terminal device to display, in the current display region, the target user interface in the layout manner indicated by the second layout information.

It should be noted that the method for processing the user interface of the application provided in this embodiment of this application may be specifically indicated in a form of program code. In the embodiment corresponding to FIG. 10, the program code may be deployed in the server. In this case, a terminal device side only needs to perform a rendering operation based on the received layout information, to display the target user interface in the current display region. Further, for a specific implementation of "the terminal device performs the rendering operation based on the first layout information (or the second layout information), to display the target user interface in the current display region", refer to the description in the embodiment corresponding to FIG. 3. Details are not described one by one herein again.

In this embodiment of this application, the second layout information corresponding to the target user interface when the target user interface is displayed in the current display region is first obtained. When the user interface changes from the layout manner indicated by the target layout information to the layout manner indicated by the second layout information, the size change ratios of the different composition elements on the user interface are the same. Then the first layout information is generated based on the second layout information, which helps reduce difficulty in a process of obtaining the first layout information, and in addition, when the first layout information is obtained in the foregoing manner, a processing procedure of a browser kernel does not need to be updated, which helps further reduce the difficulty in the process of obtaining the first layout information.

The method for processing the user interface of the application in embodiments of this application may be performed by the terminal device or the server, so that an application scenario of this solution is extended, and implementation flexibility of this solution is improved.

2. Used in a Process of Performing a Rendering Operation

Figure 11:
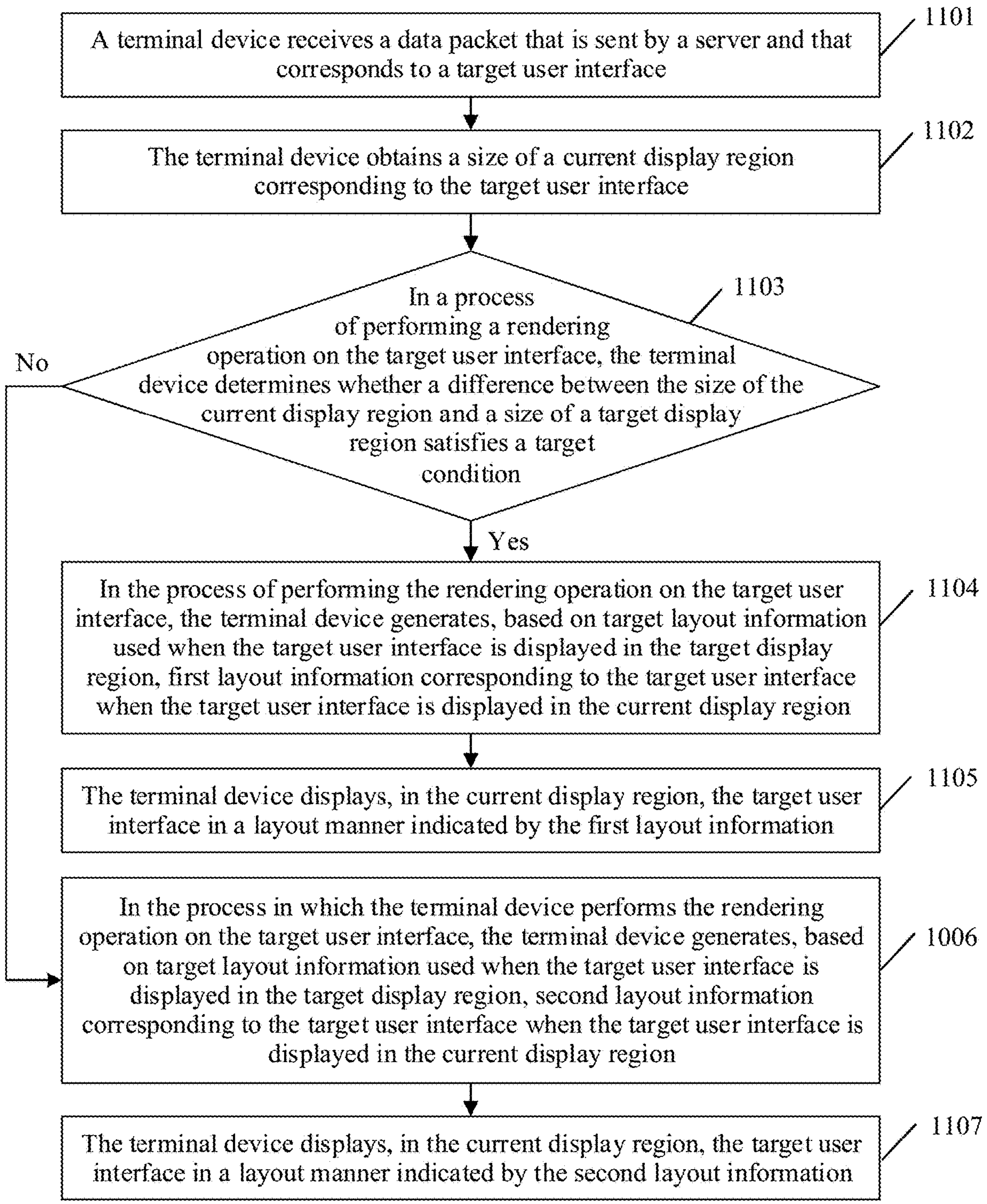
FIG. 11 is a schematic flowchart of a method for processing a user interface of an application according to an embodiment of this application.

Specifically, FIG. 11 is a schematic flowchart of a method for processing a user interface of an application according to an embodiment of this application. The method for processing the user interface of the application provided in this embodiment of this application may include the following steps.

1101: A terminal device receives a data packet that is sent by a server and that corresponds to a target user interface.

1102: The terminal device obtains a size of a current display region corresponding to the target user interface.

In this embodiment of this application, for specific implementations of steps 1101 and 1102, refer to the descriptions in steps 301 and 302 in the embodiment corresponding to FIG. 3. Details are not described herein again.

It should be noted that an execution sequence of steps 1101 and 1102 is not limited in this embodiment of this application. Step 1101 may be performed first, and then step 1102 is performed. Alternatively, step 1102 may be performed first, and then step 1101 is performed. Alternatively, step 1101 and step 1102 may be performed simultaneously.

1103: In a process of performing a rendering operation on the target user interface, the terminal device determines whether a difference between the size of the current display region and a size of the target display region satisfies a target condition; and if a determining result is yes, performs step 1104; or if a determining result is no, performs step 1106.

In this embodiment of this application, for a specific implementation of step 1103, refer to the description in step 304 in the embodiment corresponding to FIG. 3. A difference lies in that step 1103 is performed in the process in which the terminal device performs the rendering operation on the target user interface, and step 304 is performed before the terminal device performs the rendering operation on the target user interface.

1104: In the process of performing the rendering operation on the target user interface, the terminal device may generate, based on target layout information used when the target user interface is displayed in the target display region, first layout information corresponding to the target user interface when the target user interface is displayed in the current display region.

In some embodiments of this application, in the process of performing the rendering operation on the target user interface, if determining that the difference between the size of the current display region and the size of the target display region satisfies the target condition, the terminal device may generate, based on the target layout information used when the target user interface is displayed in the target display region, the first layout information corresponding to the target user interface when the target user interface is displayed in the current display region.

In the process of performing the rendering operation on the target user interface, the terminal device may first determine a style of a composition element of the target user interface, determine target layout information used by the composition element of the target user interface in the target display region, determine the first layout information corresponding to the composition element of the target user interface when the composition element of the target user interface is displayed in the current display region, and then perform compositing update, prepainting (prepaint), painting (paint), or another subsequent step. In other words, operations corresponding to steps 1103 and 1104 in this embodiment of this application may be located between the layout and the compositing update in the rendering (Render) process.

In the embodiment corresponding to FIG. 11, the "target layout information" may include location information of each composition element on the target user interface in the target display region, and the "first layout information" may include location information of each composition element on the target user interface in the current display region.

1105: The terminal device displays, in the current display region, the target user interface in a layout manner indicated by the first layout information.

In some embodiments of this application, after completing the rendering operation on the target user interface, the terminal device may display, in the current display region, the target user interface in the layout manner indicated by the first layout information.

1106: In the process in which the terminal device performs the rendering operation on the target user interface, the terminal device generates, based on target layout information used when the target user interface is displayed in the target display region, second layout information corresponding to the target user interface when the target user interface is displayed in the current display region.

1107: The terminal device displays, in the current display region, the target user interface in a layout manner indicated by the second layout information.

In this embodiment of this application, for specific implementations of steps 1106 and 1107, refer to the descriptions in steps 1104 and 1105. A difference lies in that in steps 1104 and 1105, the terminal device generates the first layout information, and displays the target user interface in the layout manner indicated by the first layout information. In steps 1106 and 1107, the terminal device generates the second layout information, and displays the target user interface in the layout manner indicated by the second layout information.

It should be noted that operations corresponding to steps 1103 and 1106 in this embodiment of this application may be located between the layout and the compositing update in the rendering (Render) process.

Figure 12:
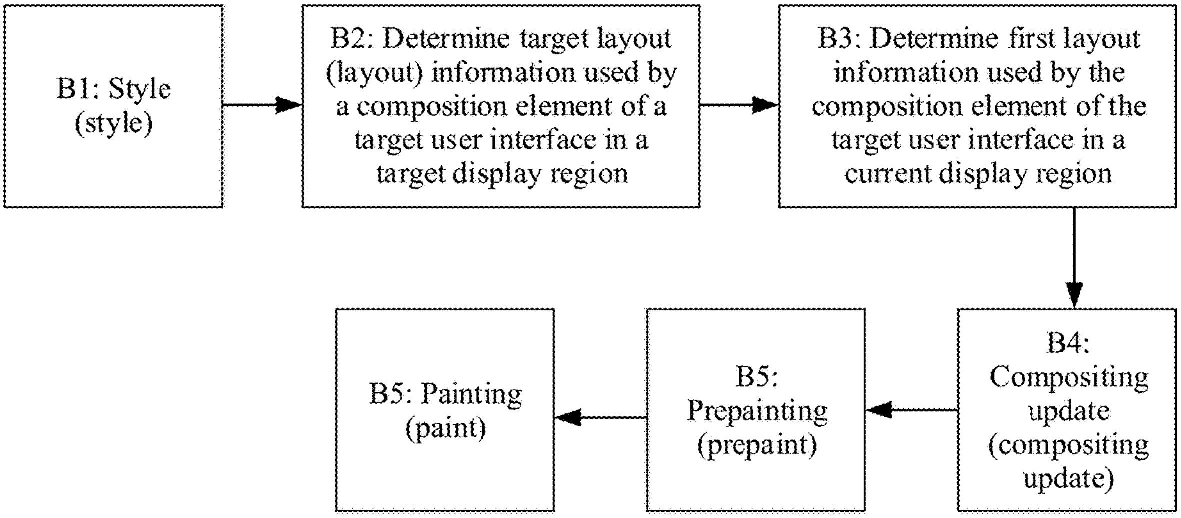
FIG. 12 is a schematic flowchart of performing a rendering operation in a method for processing a user interface of an application according to an embodiment of this application.

For more direct understanding of this solution, FIG. 12 is a schematic flowchart of performing the rendering operation in the method for processing the user interface of the application according to this embodiment of this application. As shown in FIG. 12, on a premise that the difference between the size of the current display region and the size of the target display region satisfies the target condition, a procedure of the rendering operation provided in this embodiment of this application may include: B1: Determine the style of the composition element of the target user interface, B2: determine the target layout information used by the composition element of the target user interface in the target display region, B3: Generate, based on the target layout information used by the composition element of the target user interface in the target display region, the first layout information corresponding to the composition element of the target user interface when the composition element of the target user interface is displayed in the current display region, B4: compositing update, B5: prepainting (prepaint), and B6: painting (paint). It should be understood that the example in FIG. 12 is merely used to facilitate understanding of this solution, and is not intended to limit this solution.

The method for processing the user interface of the application provided in this embodiment of this application may alternatively be used in the process of performing the rendering operation. If the target user interface is the web user interface, the method for processing the user interface of the application provided in this embodiment of this application may update a procedure in which a browser kernel performs the rendering operation process. Further, in an implementation, the browser kernel may be updated in a manner of sending a plug-in to the terminal device, and an updated browser kernel can perform the method for processing the user interface of the application provided in this embodiment of this application. In another implementation, a new browser kernel may be sent to the terminal device, and a newly installed browser kernel can perform the method for processing the user interface of the application provided in this embodiment of this application. Another specific implementation of this solution is provided, so that an application scenario of this solution is extended, and implementation flexibility of this solution is improved.

When the user interface needs to be displayed in the display region of the another size, the layout information of the user interface in the target display region may be changed. To be specific, the developer only needs to design the layout information of the user interface in the display region (namely, the target display region) of one size, which greatly reduces the development burden of the person skilled in the art; and when the user interface changes from the layout manner indicated by the target layout information to the layout manner indicated by the first layout information, the size change ratio of the first composition element and the size change ratio of the second composition element on the user interface may be different, that is, not the all composition elements on the user interface are uniformly zoomed in/out, which helps improve the adaptation between the target layout information and the target display region.

Figure 13:
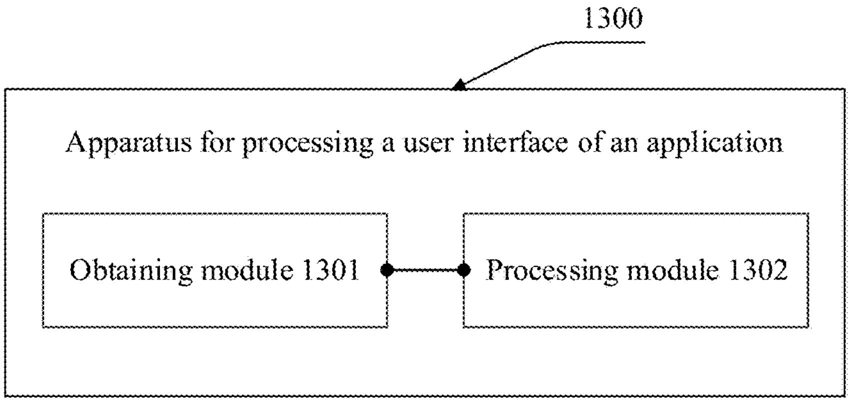
FIG. 13 is a diagram of a structure of an apparatus for processing a user interface of an application according to an embodiment of this application.

Based on the embodiments corresponding to FIG. 2 to FIG. 12, to better implement the foregoing solutions in embodiments of this application, the following further provides related devices configured to implement the foregoing solutions. For details, FIG. 13 is a diagram of a structure of an apparatus for processing a user interface of an application according to an embodiment of this application. The apparatus 1300 for processing a user interface of an application may include an obtaining module 1301, configured to obtain a size of a current display region corresponding to the user interface; and a processing module 1302, configured to: when a difference between the size of the current display region and a size of a target display region satisfies a target condition, obtain first layout information corresponding to the user interface when the user interface is displayed in the current display region, where the first layout information indicates a layout manner of a composition element of the user interface in the current display region, the first layout information is obtained based on target layout information used when the user interface is displayed in the target display region, the user interface has a first composition element and a second composition element, and when the user interface changes from a layout manner indicated by the target layout information to the layout manner indicated by the first layout information, a size change ratio of the first composition element is different from a size change ratio of the second composition element.

In a possible design, a length of a width side of the target display region is less than a length of a width side of the current display region, and the length of the width side of the target display region is less than a length of a height side of the target display region.

In a possible design, if the apparatus is used before a rendering operation is performed on the user interface, the obtaining module 1301 is further configured to obtain second layout information corresponding to the user interface when the user interface is displayed in the current display region, where when the user interface changes from the layout manner indicated by the target layout information to a layout manner indicated by the second layout information, size change ratios of different composition elements on the target user interface are the same; and the processing module 1302 is specifically configured to generate the first layout information based on the second layout information.

In a possible design, the apparatus for processing the user interface of the application is deployed in a browser kernel, and steps performed by the apparatus are included in a process of performing the rendering operation on the user interface by using the browser kernel.

In a possible design, the target condition includes any one or a combination of the following conditions: A difference between an area of the current display region and an area of the target display region is greater than or equal to a first threshold, a difference between an aspect ratio of the current display region and an aspect ratio of the target display region is greater than or equal to a second threshold, or a value of the aspect ratio of the current display region is greater than or equal to a third threshold.

It should be noted that content such as information exchange and an execution process between the modules/units in the apparatus 1300 for processing a user interface of an application is based on a same concept as the method embodiments corresponding to FIG. 2 to FIG. 12 in this application. For specific content, refer to the descriptions in the foregoing method embodiments in this application. Details are not described herein again.

Figure 14:
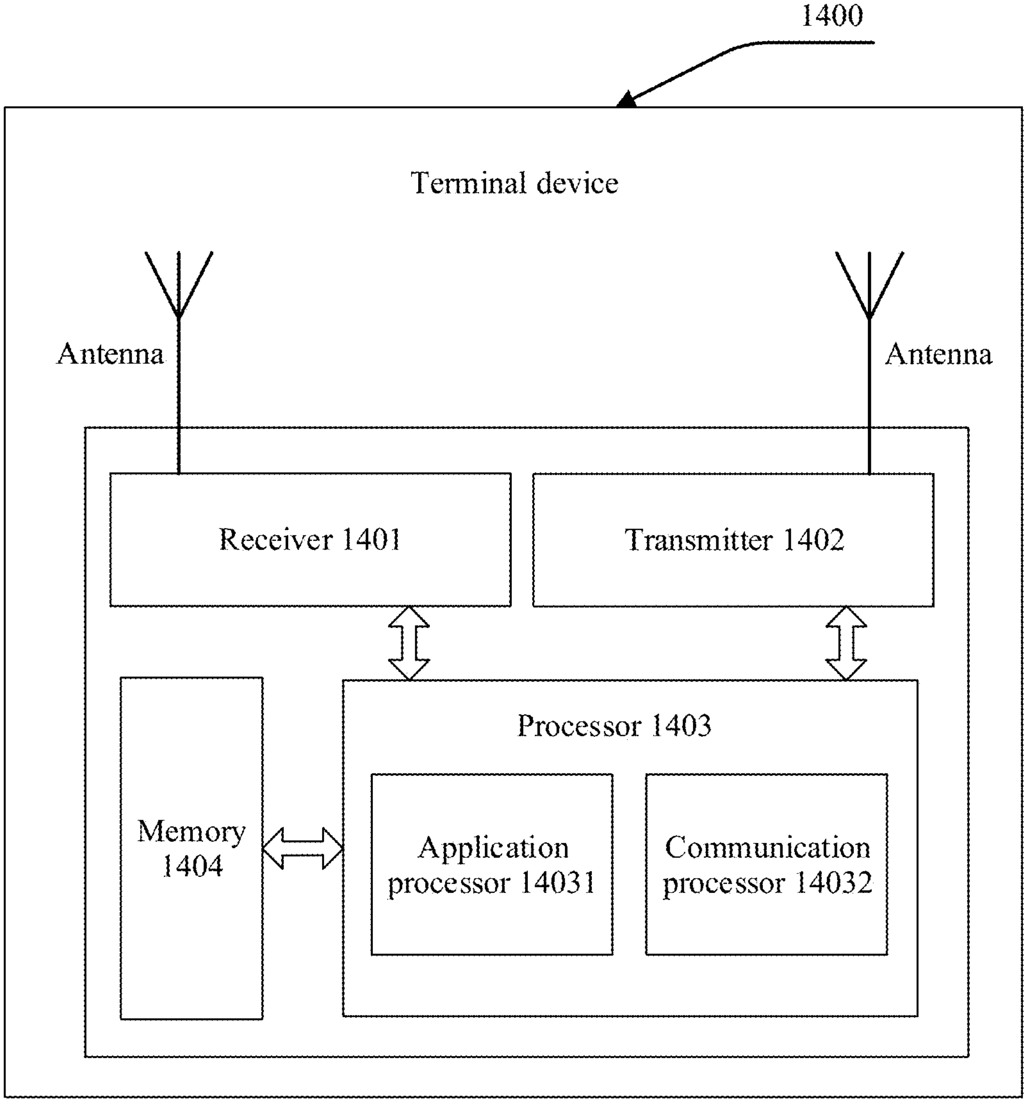
FIG. 14 is a diagram of a structure of a terminal device according to an embodiment of this application.

An embodiment of this application further provides an electronic device configured to perform a method for processing a user interface of an application. The electronic device may be specifically indicated as a terminal device or a server. When the electronic device is specifically indicated as the terminal device, FIG. 14 is a diagram of a structure of a terminal device according to an embodiment of this application. Specifically, the terminal device 1400 includes a receiver 1401, a transmitter 1402, a processor 1403, and a memory 1404 (there may be one or more processors 1403 in the terminal device 1400, and one processor is used as an example in FIG. 14). The processor 1403 may include an application processor 14031 and a communication processor 14032. In some embodiments of this application, the receiver 1401, the transmitter 1402, the processor 1403, and the memory 1404 may be connected through a bus or in another manner.

The memory 1404 may include a read-only memory and a random access memory, and provide instructions and data to the processor 1403. Apart of the memory 1404 may further include a non-volatile random access memory (NVRAM). The memory 1404 stores a processor and operation instructions, an executable module or a data structure, a subnet thereof, or an expanded set thereof. The operation instructions may include various operation instructions to implement various operations.

The processor 1403 controls an operation of the terminal device. During specific application, components of the terminal device are coupled together by using a bus system. In addition to a data bus, the bus system may further include a power bus, a control bus, a status signal bus, and the like. However, for clear description, various types of buses in the figure are marked as the bus system.

The methods disclosed in embodiments of this application may be used in the processor 1403 or may be implemented by the processor 1403. The processor 1403 may be an integrated circuit chip and has a signal processing capability. In an implementation process, steps in the foregoing methods can be implemented by using a hardware integrated logic circuit in the processor 1403, or by using instructions in a form of software. The processor 1403 may be a general-purpose processor, a digital signal processor (DSP), a microprocessor, or a microcontroller. The processor 1403 may further include an application-specific integrated circuit (ASIC), a field programmable gate array (FPGA) or another programmable logic device, a discrete gate or a transistor logic device, or a discrete hardware component. The processor 1403 may implement or perform the methods, the steps, and the logical block diagrams that are disclosed in embodiments of this application. The general-purpose processor may be a microprocessor, or the processor may be any conventional processor, or the like. The steps of the methods disclosed with reference to embodiments of this application may be directly executed and completed by a hardware decoding processor, or may be executed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1404, and the processor 1403 reads information in the memory 1404 and completes the steps in the foregoing methods in combination with hardware of the processor 1403.

The receiver 1401 may be configured to: receive input digital or character information, and generate a signal input related to a related setting and function control of the terminal device. The transmitter 1402 may be configured to output digital or character information through a first interface. The transmitter 1402 may be further configured to send instructions to a disk group through the first interface, to modify data in the disk group. The transmitter 1402 may further include a display device like a display.

In this embodiment of this application, the processor 1403 is configured to perform the method for processing the user interface of the application performed by the terminal device in the embodiments corresponding to FIG. 2 to FIG. 12. Specifically, the application processor 14031 in the processor 1403 is configured to: obtain a size of a current display region corresponding to the user interface; and when a difference between the size of the current display region and a size of a target display region satisfies a target condition, obtain first layout information corresponding to the user interface when the user interface is displayed in the current display region, where the first layout information indicates a layout manner of a composition element of the user interface in the current display region, the first layout information is obtained based on target layout information used when the user interface is displayed in the target display region, the user interface has a first composition element and a second composition element, and when the user interface changes from a layout manner indicated by the target layout information to the layout manner indicated by the first layout information, a size change ratio of the first composition element is different from a size change ratio of the second composition element.

It should be noted that a specific manner in which the application processor 14031 performs the foregoing steps is based on a same concept as the method embodiments corresponding to FIG. 9 in this application. Technical effect brought by the manner is the same as that in the method embodiments corresponding to FIG. 9 in this application. For specific content, refer to the descriptions in the foregoing method embodiments in this application. Details are not described herein again.

Figure 15:
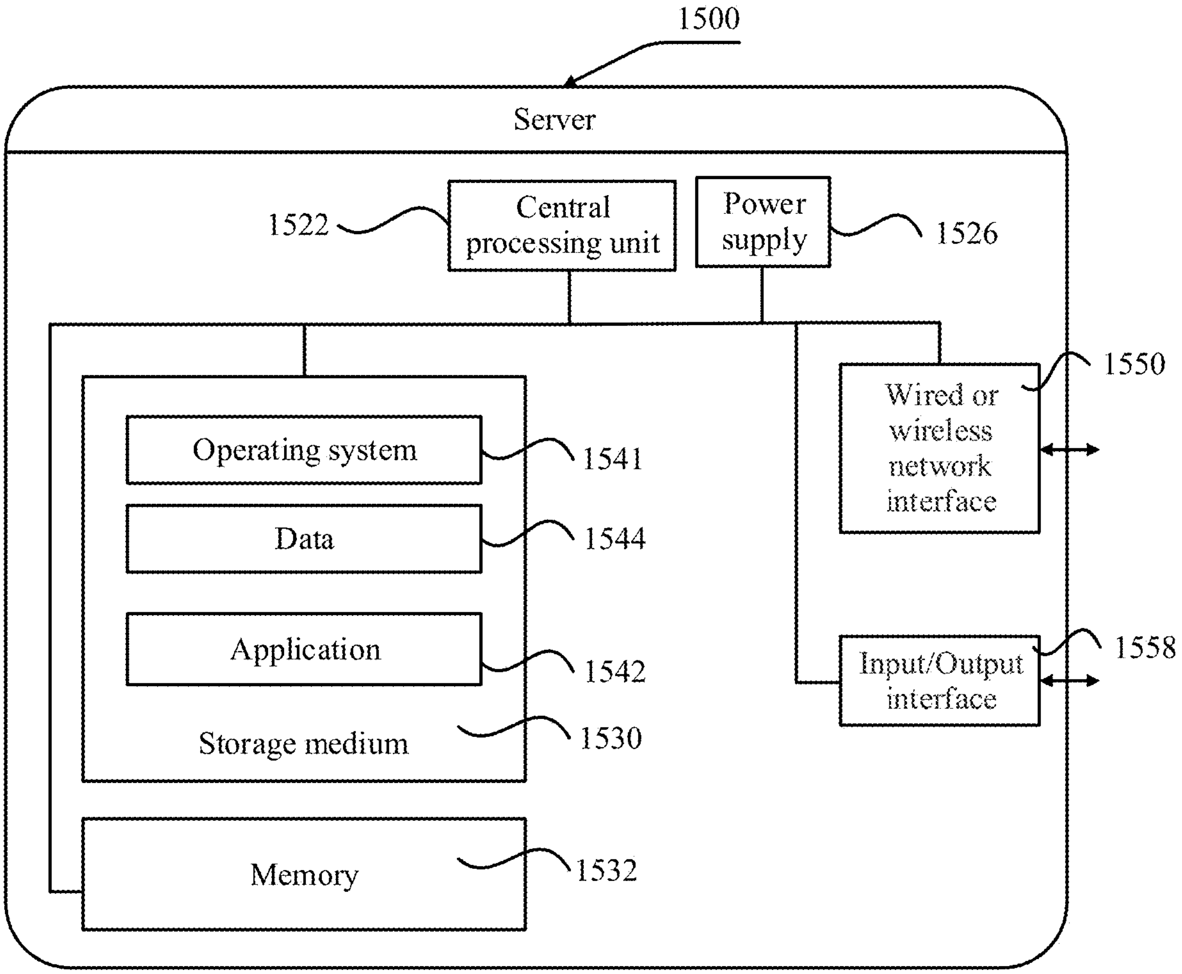
FIG. 15 is a diagram of a structure of a server according to an embodiment of this application.

When the electronic device is specifically indicated as the server, an embodiment of this application further provides a server. FIG. 15 is a diagram of a structure of a server according to an embodiment of this application. Specifically, the server 1500 is implemented by one or more servers. The server 1500 may greatly differ due to different configurations or performance, and may include one or more central processing units (CPU) 1522 (for example, one or more processors), a memory 1532, one or more storage media 1530 (for example, one or more mass storage devices) that store an application 1542 or data 1544. The memory 1532 and the storage medium 1530 may be transient storage or persistent storage. A program stored in the storage medium 1530 may include one or more modules (not shown in the figure), where each module may include a series of instruction operations for the server. Further, the central processing unit 1522 may be configured to communicate with the storage medium 1530. The series of operation instructions in the storage medium 1530 are executed on the server 1500.

The server 1500 may further include one or more power supplies 1526, one or more wired or wireless network interfaces 1550, one or more input/output interfaces 1558, and/or one or more operating systems 1541, such as Windows Server™, Mac OS X™, Unix™, Linux™, or FreeBSD™.

In this embodiment of this application, the central processing unit 1522 is configured to perform the method for processing the user interface of the application performed by the server in the embodiments corresponding to FIG. 2 to FIG. 12. Specifically, the central processing unit 1522 is configured to: obtain a size of a current display region corresponding to the user interface; and when a difference between the size of the current display region and a size of a target display region satisfies a target condition, obtain first layout information corresponding to the user interface when the user interface is displayed in the current display region, where the first layout information indicates a layout manner of a composition element of the user interface in the current display region, the first layout information is obtained based on target layout information used when the user interface is displayed in the target display region, the user interface has a first composition element and a second composition element, and when the user interface changes from a layout manner indicated by the target layout information to the layout manner indicated by the first layout information, a size change ratio of the first composition element is different from a size change ratio of the second composition element.

It should be noted that a specific manner in which the central processing unit 1522 performs the foregoing steps is based on a same concept as the method embodiments corresponding to FIG. 2 to FIG. 12 in this application. Technical effect brought by the manner is the same as that in the method embodiments corresponding to FIG. 2 to FIG. 12 in this application. For specific content, refer to the descriptions in the foregoing method embodiments in this application. Details are not described herein again.

An embodiment of this application further provides a computer program product. When the computer program product is run on a computer, the computer is enabled to perform the steps performed by the terminal device in the methods described in the embodiments shown in FIG. 2 to FIG. 12, or the computer is enabled to perform the steps performed by the server in the methods described in the embodiments shown in FIG. 2 to FIG. 12.

An embodiment of this application further provides a computer-readable storage medium. The computer-readable storage medium stores a program used for signal processing. When the program is run on a computer, the computer is enabled to perform the steps performed by the terminal device in the methods described in the embodiments shown in FIG. 2 to FIG. 12, or the computer is enabled to perform the steps performed by the server in the methods described in the embodiments shown in FIG. 2 to FIG. 12.

The apparatus for processing the user interface of the application, the apparatus for processing the user interface of the application, the terminal device, and the server that are provided in embodiments of this application may be specifically chips. The chip includes a processing unit and a communication unit. The processing unit may be, for example, a processor. The communication unit may be, for example, an input/output interface, a pin, a circuit, or the like. The processing unit may execute computer execution instructions stored in a storage unit, so that the chip executes the method for processing the user interface of the application described in the embodiments shown in FIG. 2 to FIG. 12. Optionally, the storage unit is a storage unit in the chip, for example, a register or a cache; or the storage unit may be a storage unit that is in a radio access device end and that is located outside the chip, for example, a read-only memory (ROM), another type of static storage device that can store static information and instructions, or a random access memory (RAM).

Any one of the foregoing processors may be a general-purpose central processing unit, a microprocessor, an ASIC, or one or more integrated circuits configured to control program execution of the method in the first aspect.

In addition, it should be noted that the described apparatus embodiment is merely an example. The units described as separate components may or may not be physically separate, and components displayed as units may or may not be physical units, may be located in one position, or may be distributed on a plurality of network units. Some or all of the modules may be selected based on actual requirements to achieve the objectives of the solutions of embodiments. In addition, in the accompanying drawings of the apparatus embodiments provided by this application, connection relationships between the modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any functions completed by a computer program can be easily implemented by using corresponding hardware. Moreover, a specific hardware structure used to implement a same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of this application.

All or some of the foregoing embodiments may be implemented by using software, hardware, firmware, or any combination thereof. When software is used to implement embodiments, all or some embodiments may be implemented in a form of a computer program product.

The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The invention claimed is:

1. A method for processing a user interface of an application, wherein the method comprises:

obtaining a size of a current display region corresponding to the user interface; and when a difference between the size of the current display region and a size of a target display region satisfies a target condition, obtaining first layout information corresponding to the user interface when the user interface is displayed in the current display region, wherein the first layout information indicates a layout manner of a composition element of the user interface in the current display region, the first layout information is obtained based on target layout information used when the user interface is displayed in the target display region, the user interface has a first composition element and a second composition element, and when the user interface changes from a layout manner indicated by the target layout information to a layout manner indicated by the first layout information, a size change ratio of the first composition element is different from a size change ratio of the second composition element, wherein a length of a width side of the target display region is less than a length of a width side of the current display region, the width side of the target display region and a height side of the target display region are two sides that are not parallel to each other, and the length of the width side of the target display region is less than a length of the height side of the target display region.

2. The method according to claim 1, wherein the method further comprises:

before a rendering operation is performed on the user interface, obtaining second layout information corresponding to the user interface when the user interface is displayed in the current display region, wherein when the user interface changes from the layout manner indicated by the target layout information to a layout manner indicated by the second layout information, size change ratios of different composition elements on the user interface are the same, and wherein the obtaining first layout information corresponding to the user interface when the user interface is displayed in the current display region comprises generating the first layout information based on the second layout information.

3. The method according to claim 1, wherein the method is used in a process of performing a rendering operation on the user interface by using a browser kernel.

4. The method according to claim 1, wherein the target condition comprises any one or a combination of the following conditions: a difference between an area of the current display region and an area of the target display region is greater than or equal to a first threshold, a difference between an aspect ratio of the current display region and an aspect ratio of the target display region is greater than or equal to a second threshold, or a value of the aspect ratio of the current display region is greater than or equal to a third threshold.

5. The method according to claim 1, wherein the method is performed by a terminal device on which the application is deployed, or the method is performed by a server corresponding to the application.

6. An apparatus for processing a user interface of an application, wherein the apparatus comprises:

at least one processor; and one or more memories coupled to the at least one processor and storing programming instructions for execution by the at least one processor to:

obtain a size of a current display region corresponding to the user interface; and when a difference between the size of the current display region and a size of a target display region satisfies a target condition, obtain first layout information corresponding to the user interface when the user interface is displayed in the current display region, wherein the first layout information indicates a layout manner of a composition element of the user interface in the current display region, the first layout information is obtained based on target layout information used when the user interface is displayed in the target display region, the user interface has a first composition element and a second composition element, and when the user interface changes from a layout manner indicated by the target layout information to a layout manner indicated by the first layout information, a size change ratio of the first composition element is different from a size change ratio of the second composition element, wherein a length of a width side of the target display region is less than a length of a width side of the current display region, the width side of the target display region and a height side of the target display region are two sides that are not parallel to each other, and the length of the width side of the target display region is less than a length of the height side of the target display region.

7. The apparatus according to claim 6, wherein the programming instructions are for execution by the at least one processor to:

before a rendering operation is performed on the user interface, obtain second layout information corresponding to the user interface when the user interface is displayed in the current display region, wherein when the user interface changes from the layout manner indicated by the target layout information to a layout manner indicated by the second layout information, size change ratios of different composition elements on the user interface are the same, and wherein obtaining the first layout information corresponding to the user interface when the user interface is displayed in the current display region comprises generating the first layout information based on the second layout information.

8. The apparatus according to claim 6, wherein the apparatus for processing the user interface of the application is deployed in a browser kernel, and steps performed by the apparatus are comprised in a process of performing a rendering operation on the user interface by using the browser kernel.

9. The apparatus according to claim 6, wherein the target condition comprises any one or a combination of the following conditions: a difference between an area of the current display region and an area of the target display region is greater than or equal to a first threshold, a difference between an aspect ratio of the current display region and an aspect ratio of the target display region is greater than or equal to a second threshold, or a value of the aspect ratio of the current display region is greater than or equal to a third threshold.

10. An electronic device, comprising:

at least one processor; and one or more memories coupled to the at least one processor and storing programming instructions for execution by the at least one processor to:

obtain a size of a current display region corresponding to a user interface of an application; and based on a difference between the size of the current display region and a size of a target display region, obtain first layout information corresponding to the user interface when the user interface is displayed in the current display region, wherein the first layout information indicates a layout manner of a composition element of the user interface in the current display region, the first layout information is obtained based on target layout information used when the user interface is displayed in the target display region, the user interface has a first composition element and a second composition element, and when the user interface changes from a layout manner indicated by the target layout information to a layout manner indicated by the first layout information, a size change ratio of the first composition element is different from a size change ratio of the second composition element, wherein a length of a width side of the target display region is less than a length of a width side of the current display region, the width side of the target display region and a height side of the target display region are two sides that are not parallel to each other, and the length of the width side of the target display region is less than a length of the height side of the target display region.

11. The electronic device according to claim 10, wherein the programming instructions are for execution by the at least one processor to:

before a rendering operation is performed on the user interface, obtain second layout information corresponding to the user interface when the user interface is displayed in the current display region, wherein when the user interface changes from the layout manner indicated by the target layout information to a layout manner indicated by the second layout information, size change ratios of different composition elements on the user interface are the same, and wherein obtaining the first layout information corresponding to the user interface when the user interface is displayed in the current display region comprises generating the first layout information based on the second layout information.

12. The electronic device according to claim 10, wherein the user interface is rendered by a browser kernel.

13. The electronic device according to claim 10, wherein the difference between the size of the current display region and the size of the target display region satisfies a target condition, and the target condition comprises:

a difference between an area of the current display region and an area of the target display region is greater than or equal to a first threshold.

14. The electronic device according to claim 10, wherein the difference between the size of the current display region and the size of the target display region satisfies a target condition, and the target condition comprises:

a difference between an aspect ratio of the current display region and an aspect ratio of the target display region is greater than or equal to a second threshold.

15. The electronic device according to claim 10, wherein the difference between the size of the current display region and the size of the target display region satisfies a target condition, and the target condition comprises:

a value of an aspect ratio of the current display region is greater than or equal to a third threshold.

* * * * *